US011618966B2

(12) United States Patent
Zankowski et al.

(10) Patent No.: US 11,618,966 B2
(45) Date of Patent: *Apr. 4, 2023

(54) POROUS SOLID MATERIALS AND METHODS FOR FABRICATION

(71) Applicants: IMEC VZW, Leuven (BE); Katholieke Universiteit Leuven, KU LEUVEN R&D, Leuven (BE)

(72) Inventors: Stanislaw Piotr Zankowski, Leuven (BE); Philippe M. Vereecken, Liege (BE)

(73) Assignees: IMEC VZW, Leuven (BE); Katholieke Universiteit Leuven, KU Leuven R&D, Leuven (BE)

(*) Notice: Subject to any disclaimer, the term of this patent is extended or adjusted under 35 U.S.C. 154(b) by 155 days.

This patent is subject to a terminal disclaimer.

(21) Appl. No.: 16/616,804

(22) PCT Filed: Jul. 10, 2018

(86) PCT No.: PCT/EP2018/068671
§ 371 (c)(1),
(2) Date: Nov. 25, 2019

(87) PCT Pub. No.: WO2019/016033
PCT Pub. Date: Jan. 24, 2019

(65) Prior Publication Data
US 2021/0174982 A1    Jun. 10, 2021

(30) Foreign Application Priority Data

Jul. 18, 2017  (EP) ..................................... 17181782
May 7, 2018  (EP) ..................................... 18171056

(51) Int. Cl.
*C25D 11/18* (2006.01)
*C25D 11/04* (2006.01)
(Continued)

(52) U.S. Cl.
CPC .............. *C25D 11/045* (2013.01); *C23F 1/20* (2013.01); *C23F 1/28* (2013.01); *C25D 1/006* (2013.01);
(Continued)

(58) Field of Classification Search
None
See application file for complete search history.

(56) References Cited

U.S. PATENT DOCUMENTS 4,189,357 A    2/1980  Riggs, Jr.
5,069,763 A   12/1991  Hradcovsky
(Continued)

FOREIGN PATENT DOCUMENTS

CN    101302639    * 11/2008 ............. C25D 11/02
CN    103636037 A    3/2014
(Continued)

OTHER PUBLICATIONS

Mutalib Md Jani et al. "Dressing in layers: layering surface functionalities in nanoporous aluminum oxide membranes", Angew Chem Int Ed, 2010, 49, 7933-7937. (Year: 2010).*
(Continued)

*Primary Examiner* — Stefanie S Wittenberg
(74) *Attorney, Agent, or Firm* — McDonnell Boehnen Hulbert & Berghoff LLP

(57) ABSTRACT

Porous solid materials are provided. The porous solid materials include a plurality of interconnected wires forming an ordered network. The porous solid materials may have a predetermined volumetric surface area ranging between 2 $m^2/cm^3$ and 90 $m^2/cm^3$, a predetermined porosity ranging between 3% and 90% and an electrical conductivity higher than 100 S/cm. The porous solid materials may have a predetermined volumetric surface area ranging between 3 $m^2/cm^3$ and 72 $m^2/cm^3$, a predetermined porosity ranging
(Continued)

between 80% and 95% and an electrical conductivity higher than 100 S/cm. The porous solid materials (100) may have a predetermined volumetric surface area ranging between 3 $m^2/cm^3$ and 85 $m^2/cm^3$, a predetermined porosity ranging between 65% and 90% and an electrical conductivity higher than 2000 S/cm. Methods for the fabrication of such porous solid materials and devices including such porous solid material are also disclosed.

12 Claims, 14 Drawing Sheets

(51) Int. Cl.
| | |
|---|---|
| C23F 1/20 | (2006.01) |
| C25D 1/00 | (2006.01) |
| C25D 9/02 | (2006.01) |
| C25D 11/02 | (2006.01) |
| C25D 11/12 | (2006.01) |
| C25D 11/34 | (2006.01) |
| C25D 9/06 | (2006.01) |
| C25D 11/10 | (2006.01) |
| H01M 4/66 | (2006.01) |
| H01M 8/0232 | (2016.01) |
| H01M 8/0247 | (2016.01) |
| C23F 1/28 | (2006.01) |
| C25D 3/12 | (2006.01) |
| C25D 11/24 | (2006.01) |
| H01M 4/04 | (2006.01) |
| H01M 4/80 | (2006.01) |
| C25D 1/08 | (2006.01) |
| H01B 1/02 | (2006.01) |
| H01B 5/00 | (2006.01) |
| B82Y 30/00 | (2011.01) |
| B82Y 40/00 | (2011.01) |

(52) U.S. Cl.
CPC ............... *C25D 1/08* (2013.01); *C25D 3/12* (2013.01); *C25D 9/02* (2013.01); *C25D 9/06* (2013.01); *C25D 11/022* (2013.01); *C25D 11/024* (2013.01); *C25D 11/10* (2013.01); *C25D 11/12* (2013.01); *C25D 11/18* (2013.01); *C25D 11/24* (2013.01); *C25D 11/34* (2013.01); *H01B 1/02* (2013.01); *H01B 5/002* (2013.01); *H01M 4/0404* (2013.01); *H01M 4/045* (2013.01); *H01M 4/0407* (2013.01); *H01M 4/0442* (2013.01); *H01M 4/0452* (2013.01); *H01M 4/0471* (2013.01); *H01M 4/661* (2013.01); *H01M 4/80* (2013.01); *H01M 8/0232* (2013.01); *H01M 8/0247* (2013.01); *B82Y 30/00* (2013.01); *B82Y 40/00* (2013.01)

(56) References Cited

U.S. PATENT DOCUMENTS

| | | |
|---|---|---|
| 5,277,788 A | 1/1994 | Nitowski et al. |
| 6,540,900 B1 | 4/2003 | Kinard et al. |
| 9,057,144 B2 | 6/2015 | Tiwari et al. |
| 10,374,218 B2 | 8/2019 | Labyedh et al. |
| 2009/0297913 A1 | 12/2009 | Zhang et al. |
| 2011/0111290 A1 | 5/2011 | Uchida et al. |
| 2014/0342236 A1 | 11/2014 | Goyal |
| 2016/0032475 A1* | 2/2016 | Huyghebaert ........ H01L 29/413 174/128.1 |
| 2016/0153104 A1 | 6/2016 | Yamashita |
| 2017/0125789 A1 | 5/2017 | Labyedh et al. |
| 2020/0181789 A1 | 6/2020 | Zankowski et al. |
| 2020/0181792 A1 | 6/2020 | Zankowski et al. |
| 2020/0194773 A1 | 6/2020 | Zankowski et al. |

FOREIGN PATENT DOCUMENTS

| | | |
|---|---|---|
| CN | 104947167 A | 9/2015 |
| EP | 2562851 A1 | 2/2013 |
| EP | 2980014 A1 | 2/2016 |
| EP | 3026764 A1 | 6/2016 |
| JP | S5176137 A | 7/1976 |
| JP | S5314114 A | 2/1978 |
| JP | H6192887 A | 2/1996 |
| JP | 2011179103 A | 9/2011 |
| JP | 2012241224 A | 12/2012 |
| JP | 2016053212 A | 4/2016 |
| JP | 2016195202 A | 11/2016 |
| WO | 2009105773 A2 | 8/2009 |
| WO | 2015012234 A1 | 1/2015 |
| WO | 2015029881 A1 | 3/2015 |
| WO | 2016158631 A1 | 10/2016 |

OTHER PUBLICATIONS

Vanpaemel et al., "The formation mechanism of 3D porous anodized aluminum oxide templates from an aluminum film with copper impurities", The Journal of Physical Chemistry C, 2015, 119, 2105-2112. (Year: 2015).*

Mendez et al., "Effect of sharp diameter geometrical modulation on the magnetization reversal of bi-segmented FeNi nanowires", Nanomaterials, 2018, 8, 595. (Year: 2018).*

Santos et al., "Understanding and morphology control of pore modulations in nanoporous anodic alumina by discontinuous anodization", Phys. Status Solidi A, 209, 10, 2045-2048, 2012. (Year: 2012).*

Guoqu, Z. & Bo, I. & Hongxing, Dang. (2009). Methods for removing the barrier layer of anodic aluminum oxide membranes. Chemistry Bulletin / Huaxue Tongbao. 72. 516-523 (English language Abstract and English language machine translation included).

PCT International Search Report and Written Opinion, PCT International Application No. PCT/EP2018/069152, dated Sep. 28, 2018, 18 pages.

PCT International Search Report and Written Opinion, PCT International Application No. PCT/EP2018/068674, dated Sep. 26, 2018, 10 pages.

PCT International Search Report and Written Opinion, PCT International Application No. PCT/EP2018/068683, dated Sep. 24, 2018, 15 pages.

PCT International Search Report and Written Opinion, PCT International Application No. PCT/EP2018/068671, dated Sep. 20, 2018, 17 pages.

* cited by examiner

POROUS SOLID MATERIALS AND METHODS FOR FABRICATION

CROSS-REFERENCE

The present application is a 371 U.S. national phase of International application No. PCT/EP2018/068671, filed Jul. 10, 2018 which claims priority to European Patent Application Nos. 17181782.8, filed Jul. 18, 2017 and 18171056.7, filed May 7, 2018, which applications are hereby incorporated by reference in their entirety.

FIELD OF THE DISCLOSURE

The present disclosure relates to porous solid materials, such as mesh-based solid materials, with controllable structural properties. More in particular, the present disclosure relates to porous solid materials comprising interconnected micro-structures or nano-structures such as interconnected microwires or interconnected nanowires. The present disclosure further relates to methods for fabricating such solid porous materials with controllable structural properties, such as a controllable volumetric surface area, a controllable porosity and a controllable pore size.

BACKGROUND OF THE DISCLOSURE

Porous materials having a large surface area are attractive for a wide range of applications, such as catalysis, filtering, sensing or energy storage. Electrically insulating materials, such as Metal Organic Frameworks (MOFs) or zeolites have been demonstrated as attractive microporous media for gas storage, chemicals separation or hydrocarbons conversion. Porous and electrically conductive materials (PCM's) can be used e.g. as current collectors for sensors, water electrolyzers, fuel cells or batteries. Such materials may, for example, comprise metallic foams, metal (nano)particles, metal sponges, carbon blacks, carbon aerogels, carbon fibers or carbon nanotubes.

Relevant characteristics or properties of porous electrically conductive materials for device applications are, for example, their electrical conductivity, specific surface area (either the gravimetric surface area [$m^2/g$] or the volumetric surface area [$m^2/cm^3$]), porosity, average pore size, and structural integrity or robustness.

For example, the electrical conductivity of a PCM determines the applicability of the material for electronic devices relying on fast electron transfer, such as for example batteries, fuel cells, sensors or supercapacitors. A low electrical conductivity (thus a high electrical resistance) may result in high power losses and excessive heat generation during device operation, possibly leading to device failure, such as for example self-ignition of lithium ion batteries. Metals such as copper or nickel have very high electrical conductivity values in the order of $10^5$ S/cm, while carbon materials such as graphite have electrical conductivity values in the order of $10^2$ S/cm.

The electrical conductivity of a PCM is also related to its porosity. For example, metallic foams of high porosity (e.g. 90% to 99% porosity) have 100 times to 1000 times reduced electrical conductivity as compared to the bulk metal, e.g. $10^2$-$10^3$ S/cm. Porous carbon materials such as compressed carbon blacks (e.g. 75% to 90% porosity), compressed carbon nanotubes (e.g. 80% to 90% porosity) or compressed graphene (e.g. 80% to 90% porosity) show conductivities ranging between $10^{-2}$ S/cm and 1 S/cm.

A higher surface area of a PCM may lead to higher reaction rates and a lower electrode resistance. For example, metallic sponges such as Raney nickel, having a high specific surface area, for example ranging between 30 $m^2/g$ and 100 $m^2/g$, show high catalytic activity during water electrolysis or heterogenous organic synthesis. A high volumetric surface area (expressed as the surface area normalized per unit volume of the material) additionally reduces the geometrical footprint of PCM based devices, which may be advantageous for e.g. microelectronics applications.

The material porosity, expressed in %, is a measure of the relative amount of empty volume inside the material. A high porosity is, for example, desired when a functional layer is to be deposited on the surfaces of a PCM. As an example, in case of batteries using metal foams as current collectors, a high porosity of the foam (typically 75% to 98%) allows obtaining an increased volume of active electrode material within the electrode assembly, thereby increasing the charge capacity of the device. As another example, a high porosity of a sensor electrode allows for an increased amount of the analyte to interact with the sensing component, thereby increasing the sensitivity of the device.

The average pore size defines the usable free space or empty space of a PCM. Devices using functional layers (e.g. sensing electrodes, battery electrodes) require the current collector to have a sufficiently high pore size to enable deposition of a functional layer (e.g. cathode active material for batteries or catalyst for fuel cells). Devices involving diffusion of species, such as for example diffusion of an analyte in a sensor electrode or diffusion of ions in an electrolyte, preferably have a pore size that is sufficiently large to enable good, substantially unimpeded, diffusion. Therefore, the pore size (pore diameter) is preferably at least 10 nm. The pore size may for example amount up to tens of micrometers, depending on the application. Metal sponges, typically having a porosity of 10% to 50%, tend to show an average pore size of 1 nm to 5 nm. This implies that little or no functional material can be deposited on the (inner) surfaces of such a material, due to imminent clogging of the pores, and that diffusion of species inside the pores may be hindered, resulting in longer response times for diffusion-based devices comprising such materials. On the other hand, metallic foams, typically having an average pore size of hundreds of micrometers can be coated with functional materials without pore clogging.

In some applications, a too high pore size of the material may result in inefficient use of the available pore volume. For example, metallic foams may have an average pore size ranging between 100 micrometers to 5000 micrometers. Due to their increased surface area, these foams are considered as attractive candidates for current collectors in solid-state batteries. For such applications, their surfaces are coated with active electrode materials, such as $LiFePO_4$, $LiMn_2O_4$ or $LiCoO_2$. However, due to the low electronic conductivity, the thickness of these active electrode materials is limited to less than 5 μm, leaving most of the pore volume unused.

Structural integrity, robustness or mechanical stability of a material determines if it can be used in a device without the need for an additional support or for binders. For example, high surface area nickel nanoparticles need to be stabilized with a binding agent when used in multi-layer capacitors. A similar problem exists for carbon black materials, commonly mixed with polymeric binders when used as current collectors for fuel cells or as conductive additives for batteries. Moreover, the lack of mechanical or structural integrity limits the electrical performance of carbon-based powders such as carbon nanotubes or carbon black particles.

The conductivity of these materials is limited by the contact resistance of the particles and significantly depends on the compression of the powder, resulting in a few orders of magnitude lower electrical conductivity as compared to interconnected metallic foams. Also, other porous materials, such as metal aerogels or nanofoams are known to be brittle, limiting for example their applicability in complex devices.

Known porous materials having an extended surface area show a tradeoff between the above-mentioned parameters (volumetric surface area, porosity, average pore size, mechanical stability, electrical conductivity).

For example, metallic sponges may reach very high volumetric surface areas (in the order of 150 $m^2/cm^3$ to 650 $m^2/cm^3$), but their porosity (typically 10% to 50%), average pore size (e.g. 1 nm to 5 nm) and mechanical stability (loose particle form) limit their usability for a broad range of device applications.

For example, metallic nanofoams (aerogel monoliths) are materials composed of randomly interconnected nanowires. They may, for example, be fabricated by rapid thermal decomposition of metal complexes or metal nitrates or by sintering of a freeze-casted metallic nanowire slurry, but their pore size is difficult to control. Metallic nanofoams may have a high porosity (e.g. 99.0% to 99.9%), a large average pore size (e.g. 2 nm to 2000 nm) and good structural integrity, but they have a limited volumetric surface area (e.g. 0.5 $m^2/cm^3$ to 7 $m^2/cm^3$) and a limited electrical conductivity (e.g. 0.007 S/cm to 2 S/cm). They are typically highly brittle, limiting their applicability in complex devices or in flexible devices.

Different from metallic nanofoams, metallic foams are not composed of nanowires. They are commonly made by blowing gas bubbles through a molten metal, which is a process consuming a lot of energy. Metallic foams may show a high porosity (e.g. 75% to 95%), a very large average pore size (e.g. 300 micrometers to 5000 micrometers), a high electrical conductivity (e.g. 60 S/cm-7400 S/cm) and good mechanical robustness, but they have a very limited volumetric surface area (e.g. 0.0005 $m^2/cm^3$ to 0.1 $m^2/cm^3$).

Carbon aerogel monoliths may have a large volumetric surface area (e.g. in the order of 360 $m^2/cm^3$), a high porosity (up to 99%), a sufficiently large pore size (for example between 2 nm and 100 nm) and a good mechanical integrity. Such monoliths may for example be fabricated by a sol-gel process followed by firing. Their fabrication requires supercritical drying, a high temperature for firing and a neutral atmosphere during carbonization. Being composed of carbon, they have a lower electrical conductivity (e.g. 0.1 S/cm to 10 S/cm) as compared to metal-based materials such as metal foams. The structure of carbon aerogel monoliths contains a randomly distributed carbon network, which may result in a reduced electrical conductivity and increased power losses when used in e.g. batteries, due to the inhibited transport of ions inside the pores.

Carbon nanotubes are usually provided in the form of a powder of carbon nanotube bundles held together with weak Van der Waals forces, which results in a low mechanical integrity. They may have a high volumetric surface area (e.g. up to 130 $m^2/cm^3$) and a high porosity (e.g. 80% to 99%). Pore sizes have not been reported for such powders. Their fabrication requires expensive Chemical Vapor Deposition or arc-plasma methods, requiring high temperatures and vacuum. They often need to be stabilized with a binding agent when used in devices.

Compressed vertically aligned carbon nanotubes (VACNTs) were shown to have a high volumetric surface area (in the order of 90 $m^2/cm^3$), a high porosity (80%), a satisfactory average pore size (in the order of 20 nm) and an electrical conductivity up to about 6 S/cm. Due to a lack of inter-tube chemical bonding, these materials have a low mechanical integrity and possibly a reduced electrical conductivity. Further, fabrication of carbon nanotubes requires sophisticated vacuum equipment and high temperatures, making this material much more expensive than its metallic high surface area counterparts.

Carbon blacks may have a high volumetric surface area (e.g. up to 200 $m^2/cm^3$) and a high porosity (e.g. ranging between 85% and 95%) but they have a small pore size, for example ranging between 10 nm and 20 nm. Their electrical conductivity is low, for example ranging between 0.01 S/cm and 6 S/cm. They are provided in the form of a powder, resulting in a lack of mechanical integrity. Therefore, such materials need to be compressed and bound with a binding agent.

Hence there is a need for porous materials having a combination of a controllable high volumetric surface area and a controllable high porosity, wherein the materials have a sufficiently large average pore size (at least 10 nm, preferably larger than 20 nm) and a high electrical conductivity (preferably larger than 100 S/cm) and preferably also a good mechanical integrity and robustness without the need for an additional support, e.g. a rigid support, or a binding agent. Further, there is a need for a fabrication method for such porous materials, wherein the fabrication method is preferably a low-cost method not requiring sophisticated equipment, vacuum equipment or high temperature processing.

Nanowires are known to have a high surface area. When made of a metal, they may also have a high electrical conductivity. Nanowires can, for example, be fabricated by electrodeposition of a metal or by electro-precipitation of an oxide in a porous template, such as an anodized aluminum oxide (AAO) template, followed by removal of the template by etching. In this way, 3D structures comprising or consisting of a plurality of closely spaced nanowires spaced can be fabricated. An AAO template may, for example, be obtained by anodization of an aluminum substrate in an aqueous solution comprising a multiprotic acid, such as $H_2SO_4$, $H_2C_2O_4$ or $H_3PO_4$. This results in the formation of vertical channels (for example nanochannels) in a direction substantially orthogonal to the aluminum substrate surface. When the starting aluminum substrate is enriched with dopants such as Cu or Fe, the as-formed AAO template exhibits additional horizontal channels (for example nanochannels), interconnecting the vertical channels. The distance between the channels can be tuned for example between about 30 nm and 500 nm by controlling the potential used during anodization. Plating of a metal or electro-precipitation of an oxide in such porous template may result in the formation of mechanically stable 3D-interconnected nanowire networks.

The channels of the templates produced by anodization of aluminum substrates are always covered with an electrically insulating aluminum oxide barrier layer, typically having a thickness of tens to hundreds of nanometers. This barrier layer needs to be removed from the channel bottoms to enable subsequent formation of electrically conductive nanowires by electroplating inside the channels. Removal of the barrier layers may, for example, be done by wet etching, but this results in excessive widening of the channels. After electroplating of a nanowire material inside the widened channels and after removal of the template, the resulting nanowires have a rather large diameter and fill most of the volume of the material, resulting in a low porosity and a low average pore size of the structure.

Alternatively, the barrier layers at the bottom of the channels of the template may be removed by first completely removing the template form the remaining (non-anodized) part of the aluminum substrate. This results in a fragile, free-standing template with an exposed barrier layer at one side and open pores at an opposite side. The exposed barrier layer can then be removed, for example by single-side etching in a diluted $H_3PO_4$ solution, and a thin metal layer is then typically deposited to act as a working electrode (conductive substrate) for subsequent electrodeposition of metallic nanowires in the template. However, the fragility of the free-standing template makes this method hard to implement in a large-scale manufacturing environment.

Hence there is a need for a method that allows the fabrication of porous solid materials comprising a plurality of interconnected wires, such as a plurality of interconnected nanowires, with a controllable average diameter of the wires and with a controllable average interwire distance (i.e. a controllable distance between the wires), wherein the average interwire distance is larger than the average wire diameter. Such methods would allow the fabrication of wire-based porous materials, for example nanowire-based porous materials having a combination of a controllable high volumetric surface area and a controllable high porosity and simultaneously a sufficiently large average pore size. Further, there is a need for a method that allows the fabrication of such materials with a high electrical conductivity and a good mechanical integrity, stability and robustness. In addition, from an industrial point of view, there is a need for such a fabrication method that is easy to implement on a large scale in an industrial production environment, preferably at low cost.

SUMMARY OF THE DISCLOSURE

It is an objective of embodiments of the present disclosure to provide porous solid materials having a combination of a controllable high volumetric surface area and a controllable high porosity, wherein the materials have an electrical conductivity higher than 100 S/cm, preferably higher than 1000 S/cm, for example higher than 5000 S/cm. It is an object of embodiments of the present disclosure to provide such porous solid materials with an average pore size of at least 10 nm, preferably at least 20 nm. Preferably the porous solid materials have a good mechanical integrity, stability, and robustness without the need for providing an additional support or a binding agent.

It is an objective of embodiments of the present disclosure to provide porous solid materials comprising a plurality of interconnected wires, such as a plurality of interconnected nanowires, with a controllable average diameter of the wires and with a controllable average interwire distance (i.e. a controllable distance between the wires), wherein the average interwire distance is larger than the average wire diameter, such as for example a factor of 1.1 to 10 larger. It is an object of embodiments of the present disclosure to provide such wire-based porous solid materials having a combination of a controllable high volumetric surface area and a controllable high porosity and an electrical conductivity higher than 100 S/cm, preferably higher than 1000 S/cm, for example higher than 5000 S/cm. It is an object of embodiments of the present disclosure to provide such wire-based porous solid materials having an average pore size larger than 10 nm, preferably larger than 20 nm. The plurality of wires of such wire-based porous solid materials being interconnected, they have a good mechanical integrity, stability, and robustness without the need for providing an additional, e.g. rigid support.

It is an objective of embodiments of the present disclosure to provide such porous solid materials, for example wire-based porous solid materials, with a pore size distribution having a standard deviation 6 that is smaller than 30% of an average pore size of the porous solid material.

It is an objective of embodiments of the present disclosure to provide such porous solid materials, for example wire-based porous solid materials, that are mechanically flexible.

It is a further objective of embodiments of the present disclosure to provide a fabrication method for such porous solid materials, for example wire-based porous solid materials, wherein the fabrication method is a low-cost method not requiring sophisticated equipment, vacuum equipment or high-temperature processing. It is an objective of embodiments of the present disclosure to provide a fabrication method for such porous solid materials that is suitable for and compatible with large-scale industrial manufacturing.

It is a further objective of embodiments of the present disclosure to provide devices comprising such porous solid material.

The above objectives are at least partially accomplished by a device and a method according to the present disclosure.

According to a first aspect, the disclosure is related to porous solid materials, more in particular to wire-based porous solid materials, with controllable structural properties, such as a controllable volumetric surface area, a controllable porosity, and a controllable pore size, wherein the porous solid materials are electrically conductive.

A porous solid material is provided, the porous solid material comprising a plurality of interconnected wires, the plurality of interconnected wires forming an ordered network, wherein the porous solid material has a predetermined volumetric surface area, a predetermined porosity, and a good electrical conductivity. In embodiments of the first aspect of the present disclosure the porous solid material may have a predetermined volumetric surface area ranging between 2 $m^2/cm^3$ and 90 $m^2/cm^3$, in combination with a predetermined porosity ranging between 3% and 90% and an electrical conductivity higher than 100 S/cm, for example higher than 1000 S/cm, for example higher than 5000 S/cm. In embodiments of the first aspect of the present disclosure the porous solid material may have a predetermined volumetric surface area ranging between 3 $m^2/cm^3$ and 72 $m^2/cm^3$ in combination with a predetermined porosity ranging between 80% and 95% and an electrical conductivity higher than 100 S/cm, for example higher than 1000 S/cm, for example higher than 5000 S/cm. In embodiments of the first aspect of the present disclosure the porous solid material may have a predetermined volumetric surface area ranging between 3 $m^2/cm^3$ and 85 $m^2/cm^3$ in combination with a predetermined porosity ranging between 65% and 90% and an electrical conductivity higher than 2000 S/cm, for example higher than 5000 S/cm.

In the context of the present disclosure, the term 'wire' refers to an elongated structure having a length that is substantially larger than its width, i.e. a structure having dimensions in a longitudinal direction that are substantially larger than its dimensions in a transverse direction. It may, for example, refer to a full (filled) wire, such as e.g. a microwire or a nanowire, a pillar, such as e.g. a micropillar or a nanopillar, or a tube ('hollow' wire), such as e.g. a microtube or a nanotube.

It is an advantage of the porous solid material of the present disclosure that it may have a unique combination of: a predetermined volumetric surface area, preferably a high volumetric surface area; a predetermined porosity, preferably a high porosity; and a desired, preferably high, electrical conductivity. Such a combination of structural and electrical properties is not found in known porous solid materials.

It is an advantage of the porous solid material of the present disclosure that its structural properties may be tuned to (adapted for) a wide variety of applications, such as for example for catalysis, filtering, sensing or storage, and that it may simultaneously have a desired electrical conductivity. For example, the porous solid material of the present disclosure may be adapted for application in sensors, e.g. enabling the formation of sensors having a high sensitivity and a short response time, for electrodes of batteries such as solid-state batteries, e.g. enabling the formation of batteries with high power density and high energy density, for electrodes of supercapacitors, for electrodes of fuel cells, electrodes for water electrolysis, e.g. in combination with electro-catalysts, for mechanically integral catalysts and catalyst supports, or for particle filters.

It is an advantage of the porous solid material of the present disclosure that the need for making a trade-off between different material properties, such as for example a trade-off between volumetric surface area, porosity, average pore size, mechanical stability and/or electrical conductivity, may be substantially reduced or avoided.

It is an advantage of the porous solid material of the present disclosure that it is mechanically stable, robust and durable and that it has a good mechanical integrity. The mechanical stability and durability of the porous solid material of the present disclosure are based on its structure, which is based on a plurality of wires that are interconnected, the plurality of interconnected wires being arranged in a regular, ordered pattern. It is a further advantage of the plurality of wires being interconnected that, in case of partial fracture of the porous solid material, a substantial part of the plurality of wires may remain in electrical contact with each other, thus strongly reducing a risk of electric failure of a device comprising the porous solid material of the disclosure.

It is an advantage of embodiments of the porous solid material of the present disclosure that it can be mechanically flexible while maintaining its mechanical stability, which is advantageous in that it can be used in flexible devices, for example in devices having an adaptable shape. It is a further advantage of the porous solid material being mechanically flexible and mechanically robust that it may be more easily handled as compared to brittle materials and that it may be more suitable for integration in complex devices as compared to brittle materials.

In embodiments of the porous solid material of the present disclosure, the plurality of interconnected wires may consist of or comprise a metal, a metal alloy or a semiconductor material. For example, the plurality of interconnected wires may consist of or comprise Ni (nickel), Cu (copper), Au (gold) or Pt (platinum). This is advantageous in that it provides a desired electrical conductivity of the porous solid material.

In embodiments of the present disclosure, the porous solid material comprises a plurality of pores having a pore size ranging between 2 nm and 450 nm. In embodiments of the present disclosure, the plurality of pores of the porous solid material have a pore size distribution with a standard deviation 6 that is smaller than 30% of its average pore size. It is an advantage of a porous solid material having such a narrow pore size distribution that it enables an efficient use of the available surface area when used in a device, such as for example in a battery or a sensor. This may result in a more efficient, e.g. faster, operation of such devices as compared to similar devices comprising a solid porous material with a broad pore size distribution, e.g. a solid porous material having a random, non-ordered structure.

The average pore size of a porous solid material of the present disclosure may, for example, range between 2 nm and 300 nm, for example between 10 nm and 300 nm, for example between 20 nm and 200 nm.

In the porous solid material of the present disclosure, the plurality of interconnected wires form an ordered network comprising a plurality of first wires having a first longitudinal direction and a plurality of second wires having a second longitudinal direction different from, e.g. substantially orthogonal to, the first longitudinal direction, the plurality of first wires and the plurality of second wires are arranged according to a regular pattern with a predetermined average interwire distance between adjacent wires, and the plurality of first wires and the plurality of second wires have a predetermined average wire diameter.

In the porous solid material of the present disclosure, the plurality of first wires may be arranged according to a regular pattern with a first interwire distance between adjacent first wires and the plurality of second wires may be arranged according to a regular pattern with a second interwire distance between adjacent second wires, wherein the second interwire distance may be slightly different from the first interwire distance. For example, in embodiments wherein the first interwire distance is smaller than 100 nm, there may be substantially no difference between the first interwire distance and the second interwire distance. For example, in embodiments wherein the first interwire distance is larger than 100 nm, the difference between the first interwire distance and the second interwire distance may increase with increasing interwire distances, up to a difference of about 30% for a first interwire distance of 500 nm. In the context of the present disclosure, 'average interwire distance' refers to the average between the first interwire distance and the second interwire distance.

In embodiments of the porous solid material of the present disclosure, the plurality of first wires may have a first wire diameter and the plurality of second wires may have a second wire diameter, wherein the second wire diameter may be slightly different from the first wire diameter. For example, in embodiments wherein the first interwire distance is smaller than 100 nm, there may be substantially no difference between the first wire diameter and the second wire diameter. For example, in embodiments wherein the first interwire distance is larger than 100 nm, the difference between the first wire diameter and the second wire diameter may increase with increasing interwire distances, up to a difference of about 30% for a first interwire distance of 500 nm. In the context of the present disclosure, 'average wire diameter' refers to the average between the first wire diameter and the second wire diameter.

In embodiments of the porous solid material of the present disclosure, the predetermined average wire diameter may range between 20 nm and 500 nm, i.e. the predetermined average wire diameter may be controlled or tuned to be in the range between 20 nm and 500 nm.

In embodiments of the porous material of the present disclosure, the predetermined average interwire distance may range between 40 nm and 500 nm, i.e. the predetermined average interwire distance may be controlled or tuned to be in the range between 40 nm and 500 nm.

In embodiments of the porous solid material of the present disclosure, the predetermined average interwire distance may be larger than the predetermined average wire diameter, which is advantageous in that it may result in a combination of a large volumetric surface area, a high porosity and a sufficiently large average pore size enabling the deposition of additional layers, such as functional device layers, within the pores of the porous solid material with a substantially reduced risk of pore clogging. In embodiments of the porous solid material of the present disclosure, a ratio between the predetermined average interwire distance and the predetermined average wire diameter may range between 1.1 and 10, for example between 1.2 and 3, for example between 1.4 and 2.

In embodiments of the porous solid material of the present disclosure, the second longitudinal direction may form an angle ranging between 60° and 90° with respect to the first longitudinal direction. In embodiments of the porous solid material of the present disclosure, the second longitudinal direction may be substantially orthogonal to the first longitudinal direction.

According to a second aspect, the disclosure is related to a method for fabricating a porous solid material comprising a plurality of interconnected wires, the plurality of interconnected wires forming an ordered network comprising a plurality of first wires having a first longitudinal direction and a plurality of second wires having a second longitudinal direction different from, e.g. substantially orthogonal to, the first longitudinal direction, wherein the plurality of first wires and the plurality of second wires are arranged according to a regular pattern with a predetermined average interwire distance between adjacent wires, and wherein the plurality of first wires and the plurality of second wires have a predetermined average wire diameter. The method of the disclosure comprises: fabricating a template comprising a plurality of interconnected channels; afterward depositing a solid material within the plurality of interconnected channels of the template; and afterward removing the template to thereby obtain the porous solid material. In embodiments of the method of the present disclosure, fabricating the template comprises: performing a first anodization step of a doped valve metal layer at a predetermined anodization voltage, thereby anodizing at least part of the valve metal layer in a thickness direction and thereby forming a porous layer of valve metal oxide comprising a plurality of interconnected channels, the plurality of interconnected channels forming an ordered network comprising a plurality of first channels having the first longitudinal direction and a plurality of second channels having the second longitudinal direction, wherein the plurality of first channels and the plurality of second channels are arranged according to a regular pattern having the predetermined average interwire distance between adjacent channels, and wherein the plurality of first channels and the plurality of second channels have an average channel width, each channel having channel walls and the plurality of first channels having a channel bottom, the channel bottoms being coated with a first insulating metal oxide barrier layer as a result of the first anodization step; performing a protective treatment of the porous layer of valve metal oxide, thereby inducing hydrophobic surfaces to the channel walls and channel bottoms; performing a second anodization step at the predetermined anodization voltage after the protective treatment, thereby substantially removing the first insulating metal oxide barrier layer from the channel bottoms, inducing anodization only at the bottoms of the plurality of first channels and creating a second insulating metal oxide barrier layer at the channel bottoms; and performing an etching step in an etching solution, thereby removing the second insulating metal oxide barrier layer from the channel bottoms without thereby substantially increasing the average channel width.

In embodiments of the method of the present disclosure wherein the average channel width is smaller than the predetermined average wire diameter, fabricating the template further comprises: before depositing the solid material, performing an etching step in a diluted acid solution to thereby increase the average channel width of the plurality of channels to an increased average channel width substantially equal to the predetermined average wire diameter.

In embodiments of the method of the present disclosure wherein the average channel width is larger than the predetermined average wire diameter, the method further comprises: after removing the template, performing a chemical etching step or an electropolishing step to thereby reduce an average diameter of the plurality of wires to the predetermined average wire diameter.

In embodiments of the method of the present disclosure, the plurality of first channels may have a first channel width and the plurality of second channels may have a second channel width, wherein the second channel width may be slightly different from the first channel width. For example, in embodiments wherein the distance between adjacent channels is smaller than 100 nm, there may be substantially no difference between the first channel width and the second channel width. For example, in embodiments wherein the distance between adjacent channels is larger than 100 nm, the difference between the first channel width and the second channel width may increase with increasing distance between adjacent channels, up to a difference of about 30% for a distance of 500 nm. In the context of the present disclosure, 'average channel width' refers to the average between the first channel width and the second channel width.

In embodiments of the method of the disclosure, depositing the solid material within the plurality of interconnected channels of the template may comprise filling the plurality of interconnected channels with the solid material, e.g. completely filling the plurality of interconnected channels in a lateral direction. In embodiments of the method of the disclosure, depositing the solid material within the plurality of interconnected channels may comprise depositing a layer of solid material on the channel walls, thereby only partially filling the plurality of interconnected channels with the solid material in a lateral direction and leaving openings inside (for example for the formation of tubes, e.g. nanotubes).

In embodiments of the method of the present disclosure, depositing the solid material within the plurality of interconnected channels may comprise depositing an electrically conductive material, such as a metal or a metal oxide, for example by galvanostatic or potentiostatic electrodeposition or plating or electro-precipitation.

In embodiments of the method of the present disclosure, depositing the solid material within the plurality of interconnected channels may comprise chemical vapor deposition, atomic layer deposition or sol-gel processing, e.g. sol-gel impregnation followed by annealing.

In general, features of the second aspect of the present disclosure provide similar advantages as discussed above in relation to the first aspect of the disclosure.

It is an advantage of the method of the disclosure that it allows removing the barrier layer from the channel bottoms of the template formed by anodization, with a limited channel widening (or substantially no channel widening) at one hand and with a limited channel narrowing (or substantially no channel narrowing) on the other hand. The simultaneously limited channel widening and limited channel narrowing result in a template comprising a plurality of interconnected channels having a diameter that is substantially constant along their entire length. The limited channel widening further results in a template comprising a plurality of interconnected channels having a relatively narrow channel width, e.g. relatively narrow as compared to the distance between neighboring channels, enabling the formation of a solid material inside the plurality of interconnected channels that comprises a plurality of interconnected wires with a relatively small wire diameter, e.g. relatively small as compared to the interwire distance. This advantageously leads to a porous solid material formed within the template, wherein the porous solid material has a large porosity and a sufficiently large pore size enabling subsequent deposition of additional layers, such as functional device layers, with a substantially reduced risk of pore clogging. For example, the porous solid material may be used as a current collector in electrochemical devices such as for example electrochemical sensors, batteries, supercapacitors, fuel cells, (photo) electrolyzers or chemical reactors. The increased volume available between the plurality of interconnected wires of the porous solid material may then, for example, be utilized for providing a layer of functional material, such as a layer of active electrode material or an electrolyte material.

It is an advantage of embodiments of the method of the disclosure that it enables a good control of the diameter of the plurality of spaced channels and of the distance between neighboring channels by controlling a voltage used during anodization.

It is an advantage of the method of the disclosure that the use of an anodization based process for forming the template allows for a good control of a depth of the plurality of spaced channels by controlling a duration of the first anodization step.

It is an advantage of the method of the disclosure that it enables the fabrication of a mechanically stable porous solid material, for example an electrically conductive porous solid material, with a predetermined volumetric surface area and a predetermined porosity by a simple modification or tuning of the template used for forming the porous solid material. Modification or tuning of the template may comprise adjusting or tuning the anodization voltage used for forming the template. In some embodiments of the method of the disclosure, modification or tuning of the template may further comprise performing an etching step, for example in a diluted acid solution, to thereby increase the average channel width of the plurality of channels of the template. It is an advantage that this may substantially reduce the need for making a trade-off between different material properties, such as for example a trade-off between volumetric surface area, porosity, average pore size, mechanical stability and/or electrical conductivity.

It is an advantage of the method of the disclosure that it enables the fabrication of porous solid materials within a broad range of thicknesses, for example with a porous solid material thickness ranging from less than 1 micrometer to a few hundreds of micrometers, with a desired thickness control. It, therefore, enables the fabrication of such porous solid materials for a broad range of device dimensions, e.g. including miniaturized devices.

It is an advantage of the method of the disclosure that it is a relatively simple method that may be used on a large scale in an industrial production environment. It is an advantage of the method of the disclosure that it does not require sophisticated equipment or vacuum equipment and it is therefore potentially low-cost. It is an advantage of the method of the disclosure that it may be performed on a large scale, for example by roll-to-roll processing.

In embodiments of the method of the disclosure, the valve metal layer may comprise a layer of aluminum, an aluminum alloy, titanium, a titanium alloy, tantalum or a tantalum alloy.

In embodiments of the method of the disclosure, the protective treatment may comprise annealing at a temperature ranging between 300° C. and 550° C.

In embodiments of the method of the disclosure, the protective treatment may comprise depositing a protective layer over the channel walls and over the channel bottoms. In such embodiments, the second anodization step additionally removes the protective layer only from the channel bottoms. The protective layer may for example comprise hydrophobic silane or a polymer that is resistant to the etching solution. It may, for example, comprise a polymer selected from polystyrene, poly(methyl 2-methylpropanoate) and poly(dimethylsiloxane).

In embodiments of the method of the disclosure, the etching solution may be an aqueous etching solution, which is advantageous in that the template may be formed without the use of organic solvents, resulting in an environmentally friendly method. The aqueous etching solution may, for example, be an acidic etching solution comprising phosphoric acid, sulfuric acid, oxalic acid or chromic acid or a combination thereof. Alternatively, the etching solution may be a basic etching solution e.g. comprising ammonia, hydrogen peroxide, potassium hydroxide or a combination thereof.

In embodiments of the method of the disclosure, the etching solution may comprise a surface tension adjusting agent, which is advantageous in that the surface tension adjusting agent may facilitate penetration of the etching solution inside the plurality of channels towards the channel bottoms. The surface tension adjusting agent may, for example, be selected from ethyl alcohol, isopropyl alcohol, acetone and sodium dodecyl sulfate.

In embodiments of the method of the disclosure, the method may further comprise providing ultrasonic waves during the second anodization step, which is advantageous in that it may facilitate removal of the first insulating metal oxide barrier layer and, if present, removal of the protective layer, from the channel bottoms during the second anodization step. It may further facilitate removal of the second insulating metal oxide barrier layer from the channel bottoms during the etching step.

Embodiments of the method of the disclosure may comprise providing ultrasonic waves during the first anodization step.

Embodiments of the method of the disclosure may comprise providing ultrasonic waves during both the first anodization step and the second anodization step.

According to a third aspect, the disclosure is related to a device comprising a porous solid material of the first aspect of the present disclosure, such as for example an electrochemical sensor, a battery (e.g. a solid-state battery), a supercapacitor, a fuel cell, an electrolyzer, a photo-electrolyzer, a catalyst, a catalyst support, a particle filter or a chemical reactor. In a device of the first aspect of the present disclosure, the porous solid material may for example be used to form a current collector or an electrode.

In general, features of the third aspect of the present disclosure provide similar advantages as discussed above in relation to the first and the second aspect of the disclosure.

It is an advantage of devices according to the third aspect of the present disclosure that they may have a better performance as compared to similar devices comprising a known porous solid material. For example, a battery in accordance with the third aspect of the present disclosure may have reduced power losses, a lower electrode resistance, larger charge capacity, a higher power density, a higher energy density, and shorter charging times. For example, a sensor such as an electrochemical sensor in accordance with the third aspect of the present disclosure may have a higher sensitivity, a higher reaction rate and a shorter response time.

It is an advantage of devices according to the third aspect of the present disclosure that they may have a reduced risk of electric failure as compared to a similar device comprising a known porous solid material.

It is an advantage of devices according to the third aspect of the present disclosure that they can be miniaturized.

It is an advantage of devices according to the third aspect of the present disclosure that they may be mechanically stable, robust and durable.

It is an advantage of devices according to the third aspect of the present disclosure that they may be flexible, e.g. bendable, while maintaining a good mechanical stability.

Particular and preferred aspects of the disclosure are set out in the accompanying independent and dependent claims. Features from the dependent claims may be combined with features of the independent claims and with features of other dependent claims as appropriate and not merely as explicitly set out in the claims.

The above and other characteristics, features and advantages of the present disclosure will become apparent from the following detailed description, taken in conjunction with the accompanying drawings, which illustrate, by way of example, the principles of the disclosure. This description is given for the sake of example only, without limiting the scope of the disclosure. The reference figures quoted below refer to the attached drawings.

BRIEF DESCRIPTION OF THE DRAWINGS

FIG. 1(a) shows a top view and FIG. 1(b) shows a side view. $D_{NW}$ represents the interwire distance; $S_{NW}$ represents the wire spacing.

FIG. 2(a) shows a top view and FIG. 2(b) shows a side view. $D_{NW}$ represents the interwire distance; $d_{NW}$ represents the nanowire diameter.

In FIG. 8, the inverted triangles are based on electrochemical measurement methods; circles are based on geometrical SEM analysis; and the filled square is based on a gas adsorption technique.

Figure 1:
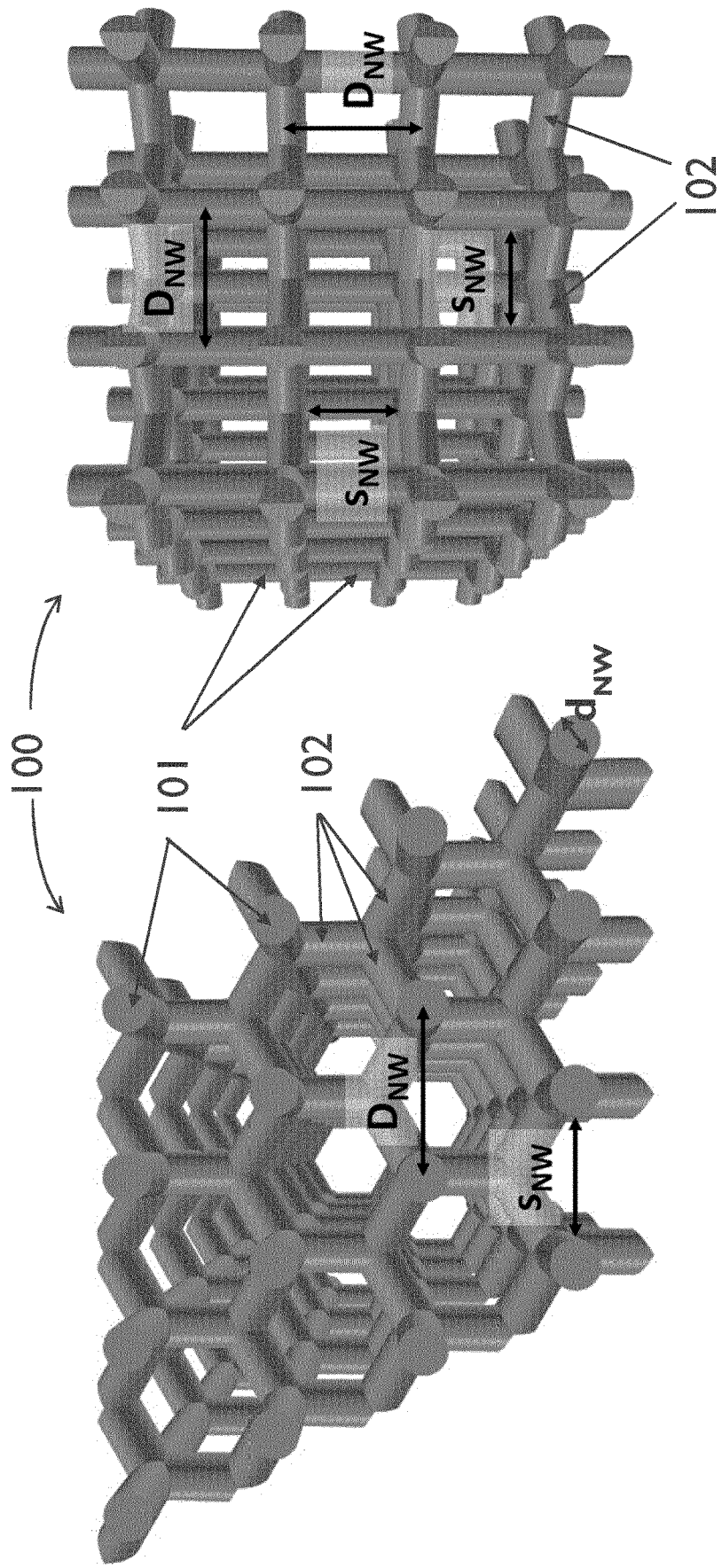
FIGS. 1(a) and 1(b) show a representative schematic representation of a porous solid material comprising a plurality of interconnected wires, according to an embodiment of the first aspect of the present disclosure.

In the different figures, the same reference signs refer to the same or analogous elements.

DETAILED DESCRIPTION OF THE DISCLOSURE

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

The term "comprising", as used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures, and techniques have not been shown in detail in order not to obscure an understanding of this description.

The following terms are provided solely to aid in the understanding of the disclosure.

In the context of the present disclosure, 'porous material' may refer to a nanoporous material or a macroporous material. In the context of the present disclosure, a macroporous material is a material having pores with a pore size (e.g. pore diameter) ranging between 50 nm and 1000 nm. In the context of the present disclosure, a nanoporous material is a material having pores with a pore size (e.g. pore diameter) smaller than 100 nm. Such nanoporous materials may further be classified into different categories, based on their pore size. In the context of the present disclosure the following terminology is used to describe the different nanoporous material categories: 'macroporous' for materials having a pore size ranging between 50 nm and 100 nm, 'mesoporous' for materials having a pore size ranging between 2 nm and 50 nm and 'microporous' for materials having a pore size lower than 2 nm. In the context of the present disclosure, 'macroporous' is thus at one hand used for nanoporous materials having a pore size ranging between 50 nm and 100 nm, as well as for materials having a pore size ranging between 100 nm and 1000 nm, i.e. a category of materials not belonging to a nanoporous category.

In the context of the present disclosure, the porosity of a material refers to the void fraction (fraction of 'empty' space or 'free' space) of the material. It is a fraction of the volume of voids or 'empty' spaces relative to the total material volume. The porosity of porous materials may, for example, be determined by gas adsorption/desorption techniques.

In the context of the present disclosure, the term 'anodization' when applied to a valve metal (such as for example aluminum) or to a valve metal layer refers to an electrochemical process comprising applying a potential or a current between the valve metal layer (the material to be anodized) functioning as a working electrode at one hand and a counter-electrode at the other hand, in the presence of an acid electrolyte. This method leads to the formation of a porous layer of valve metal oxide comprising a plurality of pores or channels, e.g. a cluster of channels, arranged in an orderly fashion (e.g. hexagonally) perpendicularly to the surface of the layer. This cluster may be referred to as an array, due to the orderly nature of the arrangement.

In the context of the present disclosure, a valve metal is a metal that can be oxidized by means of an anodization process (anodic oxidation) to thereby form a stable valve metal oxide. More in particular, in the context of the present disclosure, a valve metal is a metal selected from the group of aluminum, tungsten, titanium, tantalum, hafnium, niobium, vanadium and zirconium. In the context of the present disclosure, a valve metal layer is a layer comprising a valve metal or a valve metal alloy (or a 'doped' valve metal). An example of an aluminum alloy that may, for example, be used in the context of the present disclosure is a copper-doped aluminum layer, e.g. with a doping concentration ranging between 1% and 10%, or an iron-doped aluminum layer. A valve metal layer may be a single layer or it may be a layer stack comprising at least two valve metal layers.

In the context of the present disclosure, a functional material or a functional material layer is a material or a material layer that satisfies or provides a defined functionality and/or has defined properties, adjusted for a device in which it is integrated. A functional material or a functional material layer may, for example, have the functionality of an electrode, a current collector, a catalyst, an energy storage material, a light absorber, a photonic crystal, a light emitter, an information storage medium, an ion trap, or a gas absorber.

The disclosure will now be described by a detailed description of several embodiments of the disclosure. It is clear that other embodiments of the disclosure can be configured according to the knowledge of persons skilled in the art without departing from the technical teaching of the disclosure, the disclosure being limited only by the terms of the appended claims.

In a first aspect, the present disclosure provides porous solid materials, such as wire-based porous solid materials, with controllable structural properties. Porous solid materials of the present disclosure have a predetermined, preferably large, volumetric surface area and a predetermined, preferably large, porosity that may be controlled independently from each other. In addition, they have a controllable pore size with a relatively narrow pore size distribution. In advantageous embodiments, the porous solid materials of the present disclosure are electrically conductive.

FIGS. 1(a) and 1(b) show a schematic representation of an example of a porous solid material 100 according to an embodiment of the present disclosure, wherein the porous solid material comprises a plurality of interconnected wires 101, 102. FIG. 1(a) and FIG. 1(b) show different views of the porous solid material 100, the different views corresponding to different view directions. The view illustrated in FIG. 1(a) is further referred to as a 'top view'. The view illustrated in FIG. 1(b) is about orthogonal to the view of FIG. 1(b) and is further referred to as a 'side view'. In the example shown in FIGS. 1(a) and 1(b), the plurality of interconnected wires forms an ordered network comprising a plurality of first wires 101 having a first longitudinal direction and a plurality of second wires 102 having a second longitudinal direction different from, e.g. substantially orthogonal to, the first longitudinal direction. In the example shown, the second longitudinal direction is substantially orthogonal to the first longitudinal direction. The plurality of second wires 102 is interconnected with the plurality of horizontal wires 101 at regular intervals, thus forming a mechanically robust material structure.

In the example shown in FIGS. 1(a) and 1(b), the plurality of first wires 101 and the plurality of second wires 102 are arranged according to a regular pattern with an average interwire distance $D_{NW}$ between adjacent wires. In the context of the present disclosure, the interwire distance $D_{NW}$ is the center-to-center distance between neighboring wires. The plurality of first wires 101 and the plurality of second wires 102 have an average wire diameter $d_{NW}$. $S_{NW}$ represents the average wire spacing, i.e. the average wall-to-wall distance between neighboring wires, and can be expressed as: $S_{NW}=D_{NW}-d_{NW}$. The average wire spacing $S_{NW}$ corresponds to the average pore size $d_{pore}$ of the porous solid material. Due to the arrangement of the plurality of wires according to a regular, ordered pattern, the pores of the solid porous material of the present disclosure are also arranged in a regular, ordered pattern. As illustrated in FIGS. 1(a) and 1(b), different pore geometries (i.e. different pore cross-section shapes) can be identified, depending on the view direction. For the view direction illustrated in FIG. 1(a) the pore cross section has a hexagonal shape, whereas for the view direction illustrated in FIG. 1(b) the pore cross section has a rectangular shape. The average pore size $d_{pore}$ is defined as the average wall-to-wall distance (average spacing) between neighboring wires: $d_{pore}=D_{NW}-d_{NW}$.

In a porous solid material of the present disclosure, the plurality of first wires 101 may be arranged according to a regular pattern with a first interwire distance between adjacent first wires and the plurality of second wires 102 may be arranged according to a regular pattern with a second interwire distance between adjacent second wires, wherein the second interwire distance may be slightly different from the first interwire distance. In the description, 'average interwire distance' refers to the average between the first interwire distance and the second interwire distance.

In a porous solid material of the present disclosure, the plurality of first wires 101 may have a first wire diameter and the plurality of second wires 102 may have a second wire diameter, wherein the second wire diameter may be slightly different from the first wire diameter. In the description, 'average wire diameter' refers to the average between the first wire diameter and the second wire diameter. For example, for an aluminum-based metal layer anodized at 40 V, it was observed from experimental results that the plurality of first wires 101 formed within the template had a first wire diameter of 38 nm. The first wire diameter was substantially constant along the length of the plurality of first wires 101. It was further observed that the plurality of second wires 102 formed within the template had a second diameter of 42 nm. The second wire diameter was substantially constant along the length of the plurality of second wires 102. This results in an average wire diameter $d_{NW}$ of 40 nm. For example, for the aluminum-based metal layer anodized at 40 V a first interwire distance of 107 nm and a second interwire distance of 101 nm were measured, both being substantially constant along the length of the nanowires, resulting in an average interwire distance of 104 nm.

Figure 2:
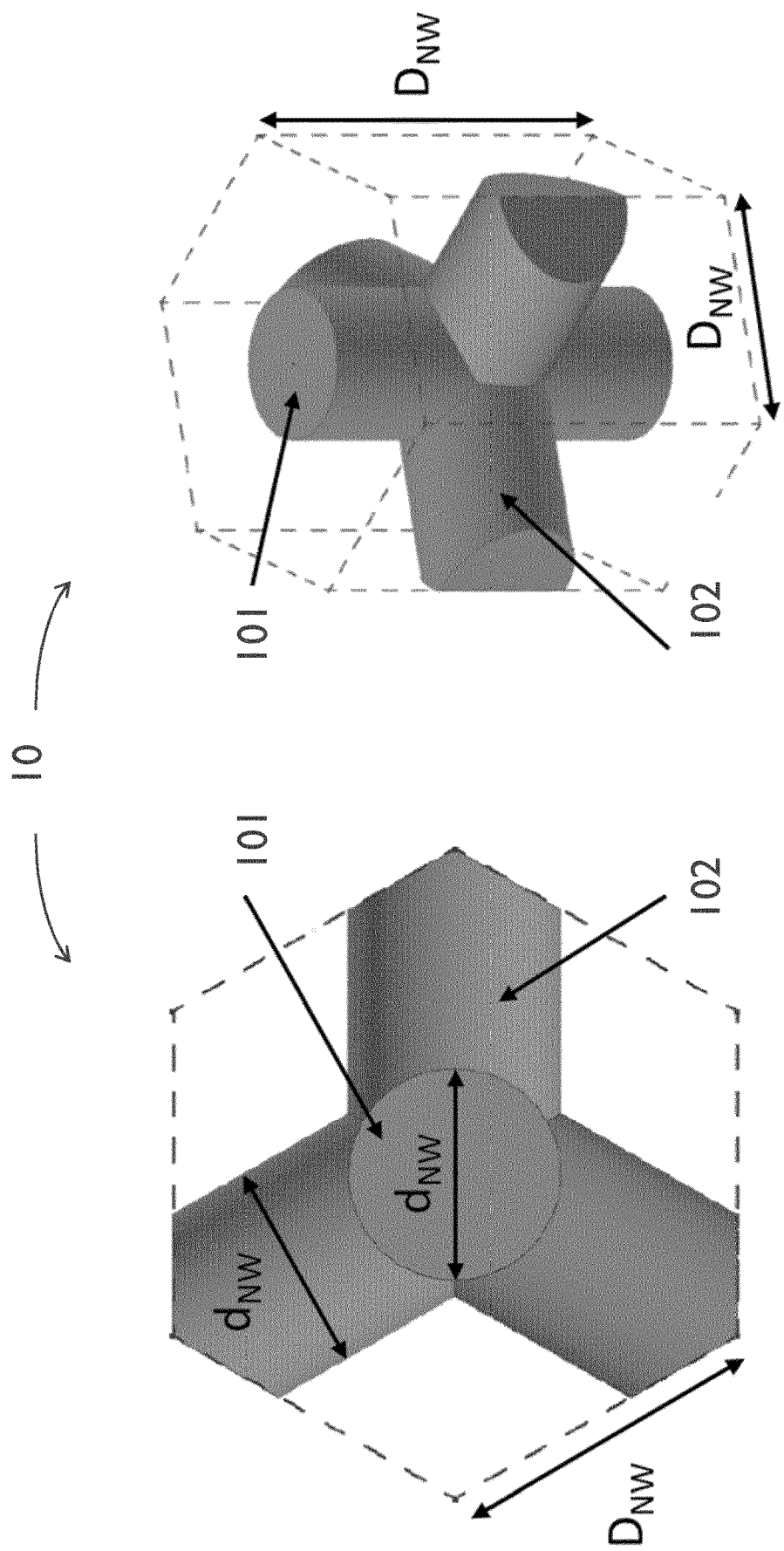
FIGS. 2(a) and 2(b) show a schematic representation of a unit cell of a hexagonal lattice, illustrating an example of an arrangement of wires within a porous solid material of the present disclosure.

In the example of the porous solid material 100 shown in FIGS. 1(a) and 1(b), the plurality of first wires 101 and the plurality of second wires 102 are arranged according to a hexagonal pattern (hexagonal lattice). A single unit cell 10 of such a hexagonal lattice is schematically represented in FIGS. 2(a) and 2(b). FIG. 2(a) shows a top view and FIG. 2(b) shows a side view. $D_{NW}$ represents the average interwire distance between neighboring wires, and $d_{NW}$ represents the average wire diameter of a wire. As illustrated in FIGS. 2(a) and 2(b), the interwire distance $D_{NW}$ corresponds to the hexagonal unit cell edge length.

A porous solid material of the present disclosure has a predetermined, preferably large, volumetric surface area and a predetermined, preferably large, porosity that may be controlled independently from each other. In addition, it has a controllable pore size with a relatively narrow pore size distribution. This is explained more in detail in the further description related to the second aspect of the present disclosure. In addition to the independently controllable structural properties, a porous solid material of the present disclosure may have a good electrical conductivity, for example when the plurality of interconnected wires consists of or comprises a metal such as nickel or copper or any other material with a high electrical conductivity. The electrical conductivity of a solid porous material is at one hand determined by the bulk electrical conductivity of the material of which the plurality of interconnected wires is composed, and at the other hand by the porosity of the material. The higher the porosity of the material, the lower the electrical conductivity of the solid porous material for a given material of which the plurality of interconnected wires is composed.

Figure 3:
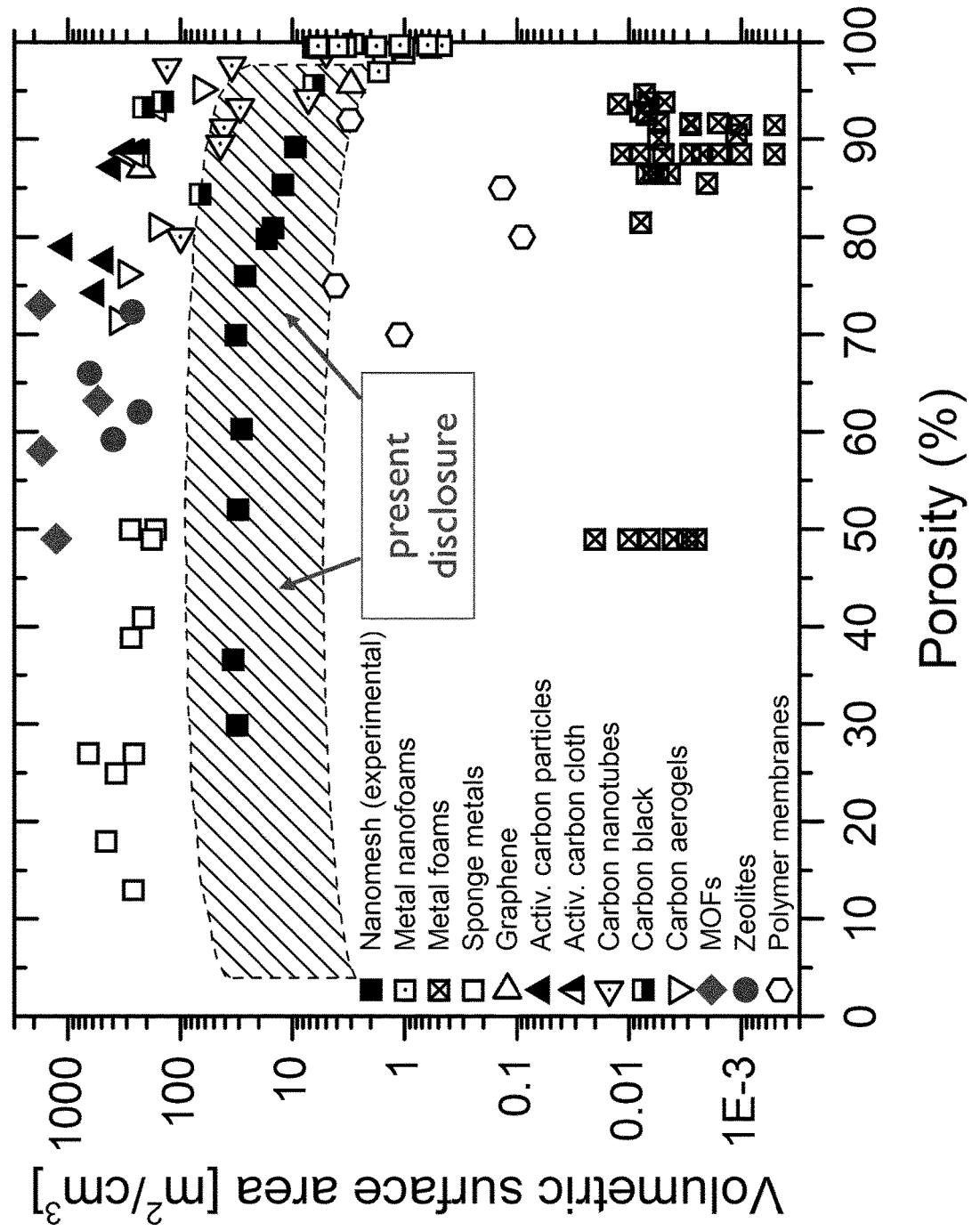
FIG. 3 illustrates the volumetric surface area versus the porosity of known porous materials (symbols) and the volumetric surface area versus the porosity of porous solid materials in accordance with the first aspect of the present disclosure (dashed areas).
Figure 4:
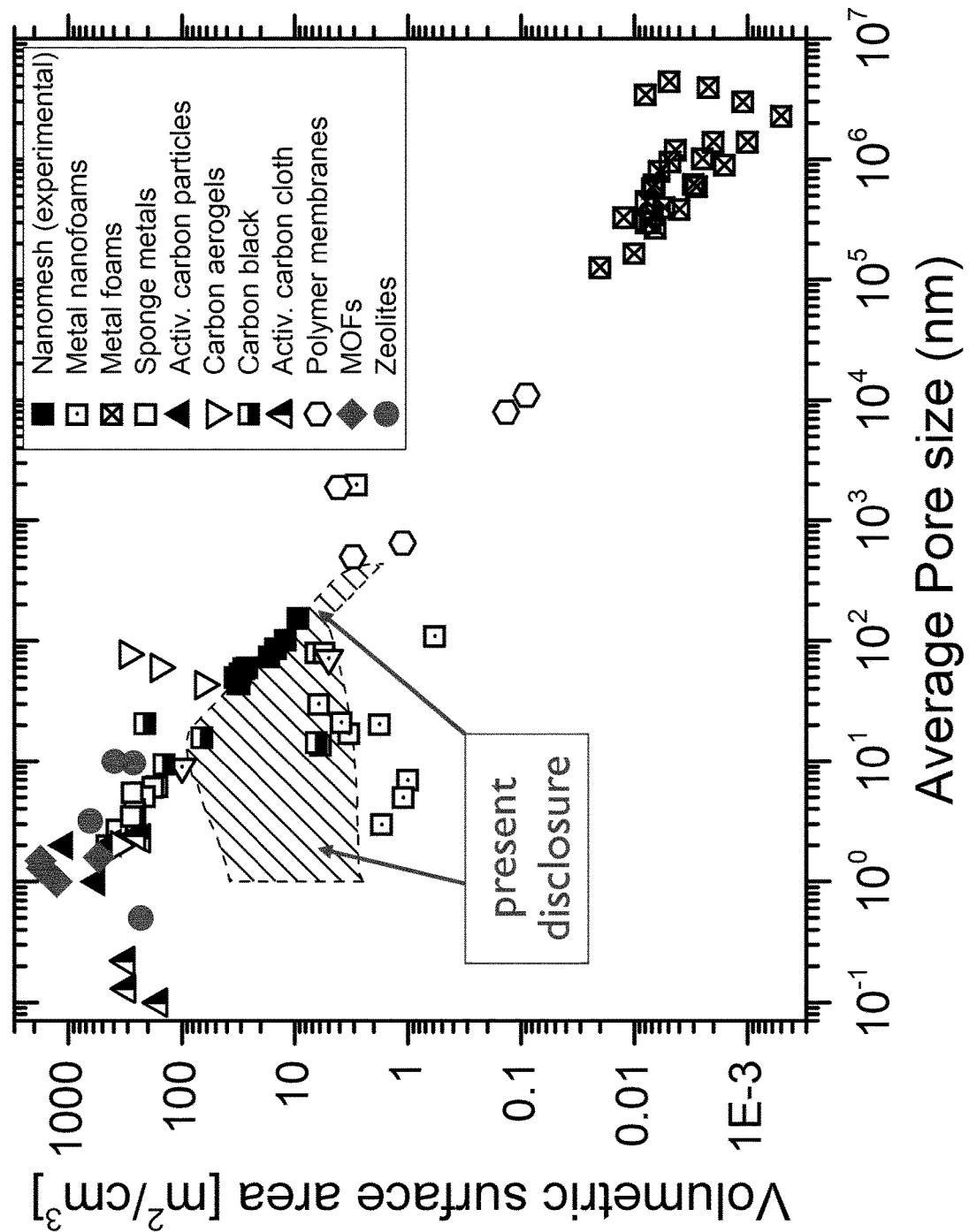
FIG. 4 illustrates the volumetric surface area versus the average pore size of known porous materials (symbols) and the volumetric surface area versus the average pore size of porous solid materials in accordance with the first aspect of the present disclosure (filled squares and dashed areas).

A porous solid material of the present disclosure may, therefore, have a combination of structural and electrical properties that is not found in known porous solid materials. This is illustrated in FIG. 3, showing the volumetric surface area versus the porosity of known porous materials as reported in the literature (symbols) and the volumetric surface area versus the porosity of porous solid materials in accordance with the first aspect of the present disclosure (filled squares and dashed areas). It is further illustrated in FIG. 4, showing the volumetric surface area versus the average pore size of known porous materials as reported in literature (symbols) and the volumetric surface area versus the average pore size of porous solid materials in accordance with the first aspect of the present disclosure (filled squares and dashed areas). As schematically shown, the volumetric surface area of a porous solid material according to the present disclosure may range between about 2 m²/cm³ and about 90 m²/cm³, its porosity may range between about 2% and about 99%, and the average pore size may range between about 2 nm and about 300 nm (to some extent depending on the corresponding volumetric surface area).

Figure 5:
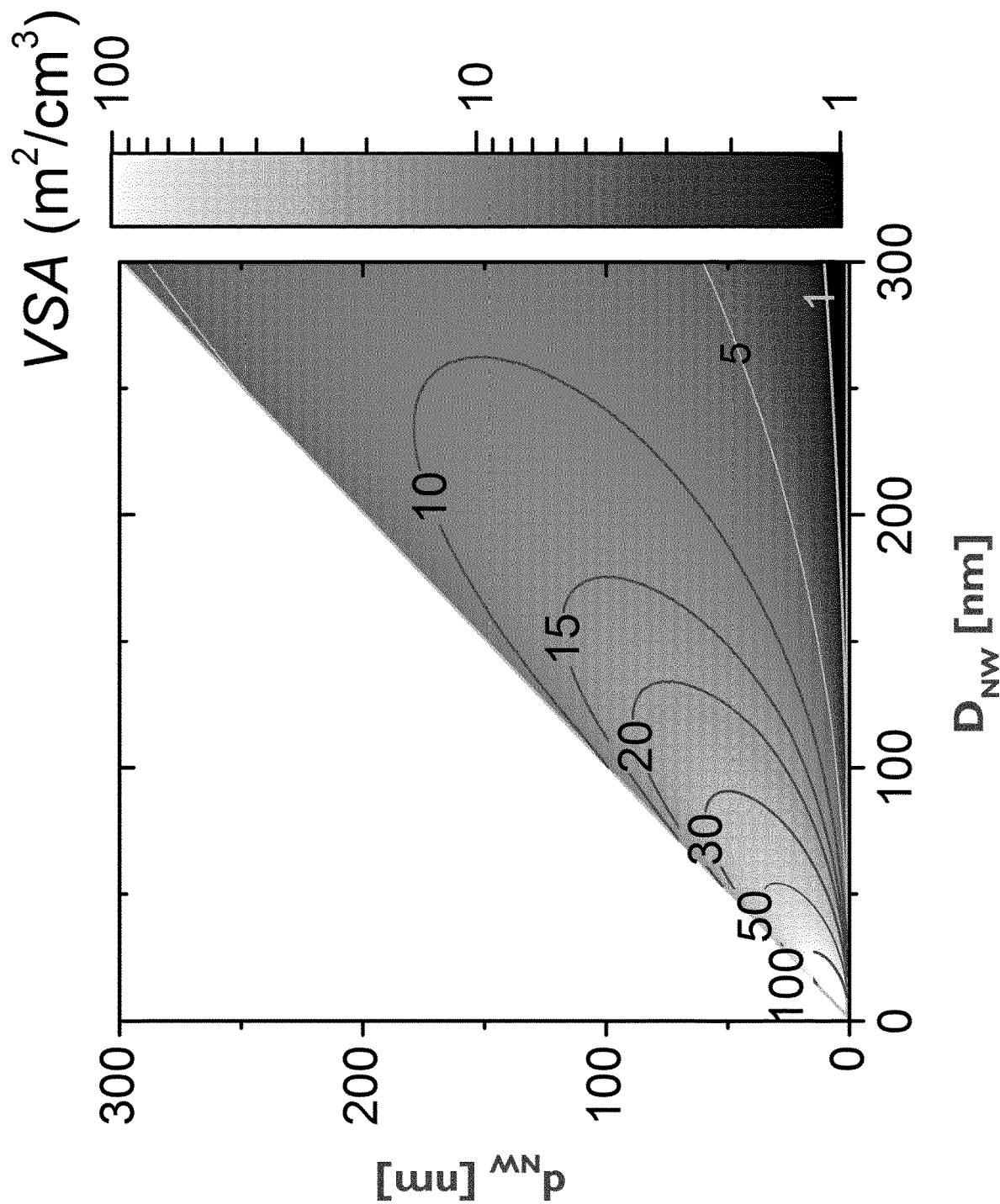
FIG. 5 shows the calculated volumetric surface area VSA as a function of the average nanowire diameter $d_{NW}$ and the average interwire distance $D_{NW}$ for a porous solid material having a structure as illustrated in FIGS. 1(a) and 1(b).
Figure 6:
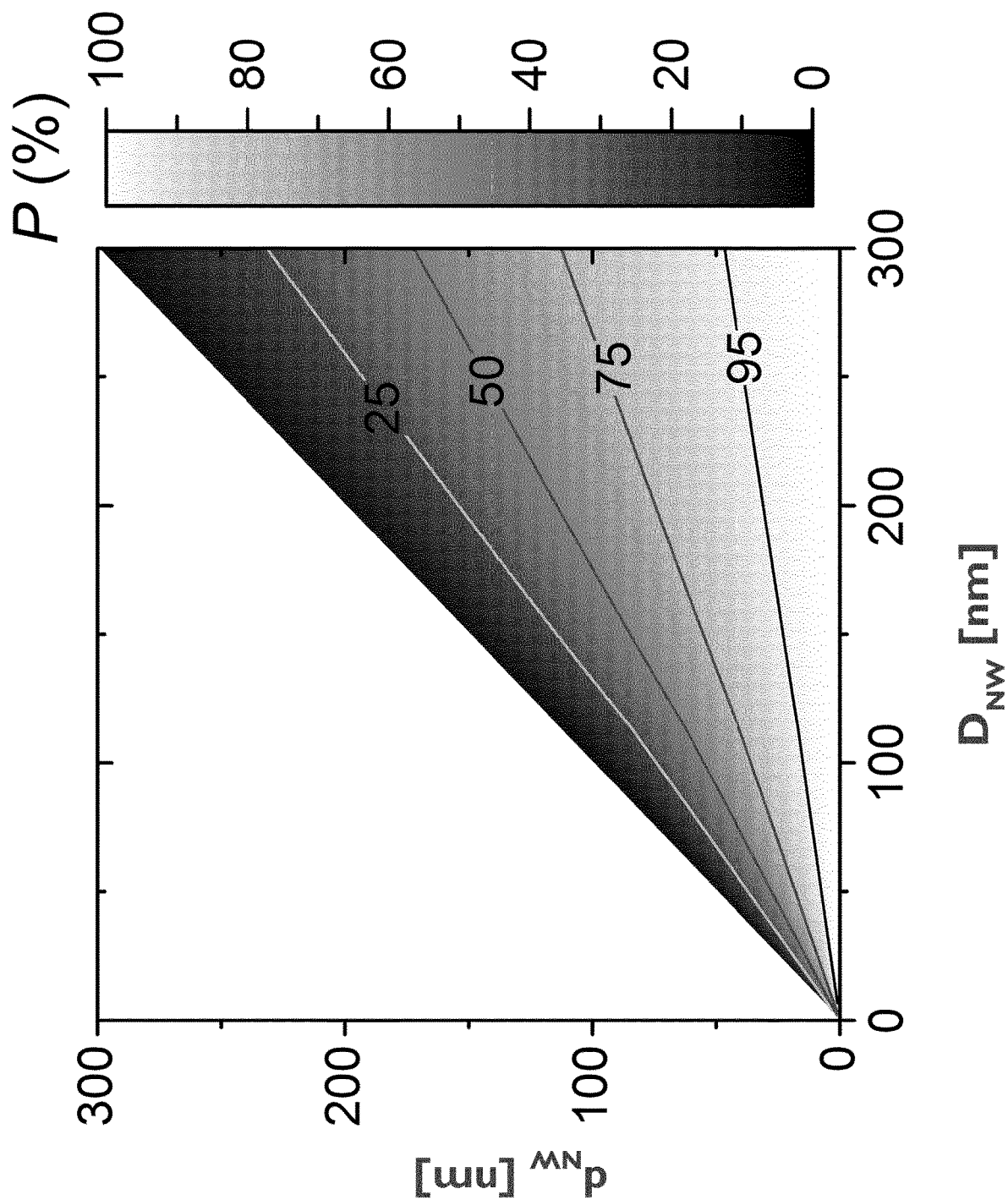
FIG. 6 shows the calculated porosity P as a function of the average nanowire diameter $d_{NW}$ and the average interwire distance $D_{NW}$ for a porous solid material having a structure as illustrated in FIGS. 1(a) and 1(b).

Simulations were performed to calculate the volumetric surface area and the porosity of solid porous materials having the structure as shown in FIGS. 1(a) and 1(b), as a function of the average nanowire diameter $d_{NW}$ and the average interwire distance $D_{NW}$. The results of these simulations are shown in FIG. 5, illustrating the calculated volumetric surface area as a function of the average nanowire diameter $D_{NW}$ and the average interwire distance $D_{NW}$ and in FIG. 6, illustrating the calculated porosity as a function of the average nanowire diameter $d_{NW}$ and the average interwire distance $D_{NW}$.

The simulations were performed based on a mathematical model of the porous solid material using the equations below. For the calculations, it was assumed that the average wire diameter is smaller than the average interwire distance ($d_{NW} < D_{NW}$).

The porosity P of a material having the hexagon-based structure illustrated in FIGS. 1(a) and 1(b) was calculated as:

$$P = 100\left(1 - d_{NW}^2 \frac{(3+\sqrt{3})\pi D_{NW} - 9 d_{NW}}{6 D_{NW}^3}\right) [\%] \quad (1)$$

The following equation was used for calculating the volumetric surface area:

$$VSA = 1000 \frac{d_{NW}\left(-27 d_{NW} + 2(3+\sqrt{3})\pi D_{NW}\right)}{3 D_{NW}^2} [m^2/cm^3] \quad (2)$$

The average pore size (or pore diameter) $d_{pore}$ is given by:

$$d_{pore} = D_{NW} - d_{NW} [nm] \quad (3)$$

The simulation results presented in FIG. 5 show that the volumetric surface area of the solid porous material reaches the highest values for small interwire distances. It is further illustrated that, for a material having an average interwire distance lower than 50 nm and an average wire diameter in the order of 25 nm, the volumetric surface area of the porous solid material is higher than 50 m²/cm³. For a higher average interwire distance, a maximum of the volumetric surface area is found at a higher average wire diameter. It was found that a maximum in the volumetric surface area may be reached for a solid porous material having an average wire diameter that equals about 55% of the average interwire distance. This allows maximizing the volumetric surface area of the solid porous material for each desired average pore size.

The simulation results presented in FIG. 6 show that the porosity of the solid porous material increases for an increased ratio between the average interwire distance $D_{NW}$ and the average wire diameter $d_{NW}$. The results illustrate for example that a porous solid material having a pore size ($d_{pore} = D_{NW} - d_{NW}$) higher than 200 nm may have a porosity above 75%. Such highly porous solid materials may simultaneously have a volumetric surface area above 5 m²/cm³ (FIG. 5).

In a second aspect, the present disclosure provides methods for fabricating porous solid materials, more in particular wire-based porous solid materials, with controllable structural properties. Methods of the second aspect of the present disclosure allow fabricating such porous solid materials with a predetermined volumetric surface area and a predetermined porosity, wherein the predetermined volumetric surface area and the predetermined porosity may be controlled independently from each other, by properly adjusting process parameters of the methods. Methods of the second aspect of the present disclosure further allow fabricating such porous solid materials with a controllable pore size, a relatively narrow pore size distribution and a good electrical conductivity.

Methods of the second aspect of the present disclosure comprise fabricating a template comprising a plurality of interconnected channels forming an ordered network, wherein the template formation is based on anodization of a valve metal layer, followed by depositing a solid material within the plurality of interconnected channels of the template, and next removing the template. Deposition of the solid material within the plurality of interconnected channels of the template results in the formation of a porous solid material comprising a plurality of interconnected wires, the porous solid material being composed of the deposited solid material.

In a method of the present disclosure the plurality of interconnected wires is formed inside the plurality of interconnected channels of the template, resulting in an average interwire distance $D_{NW}$ that is substantially equal to an average distance between neighboring channels of the template. This distance between neighboring channels may be controlled by adjusting the anodization potential used for the template formation. For embodiments wherein the valve metal layer used for fabricating the template is an aluminum layer, the proportionality constant of the anodization process may, for example, range between 1.5 nm/V and 3.0 nm/V. In other words, the average distance between neighboring channels linearly depends on the anodization potential, for example with a slope ranging between 1.5 nm/V and 3.0 nm/V.

In a method of the present disclosure, the average wire diameter $d_{NW}$ of the plurality of interconnected wires formed inside the plurality of interconnected channels of the template is substantially equal to the average channel width of the channels. The average channel width is related to the template anodization potential. For embodiments wherein the valve metal layer used for fabricating the template is an aluminum layer, the proportionality constant may, for example, range between 0.5 nm/V and 1.5 nm/V. In other words, the average channel width linearly depends on the anodization potential, for example with a slope ranging between 0.5 nm/V and 1.5 nm/V.

In embodiments of a method of the present disclosure, the average channel width of the plurality of interconnected channels of the template may be smaller than a predetermined average wire diameter of the porous solid material to be formed. In such embodiments, the method of the present disclosure may further comprise, before depositing the solid material, performing an etching step in a diluted acid solution to thereby increase the average channel width of the plurality of channels to an increased average channel width that is substantially equal to the predetermined average wire diameter. For example, if the template is formed by anodization of an aluminum layer, the etching step may be performed in a 5% $H_3PO_4$ solution. Using such an etching solution, typically about 1 nm of material is removed per minute etching.

In embodiments of a method of the present disclosure, the average channel width of the plurality of interconnected channels of the template may be larger than a predetermined average wire diameter of the porous solid material to be formed. In such embodiments, the method of the present disclosure may further comprise, after removing the template, performing a chemical etching step or an electropolishing step to thereby reduce an average diameter of the plurality of wires to the predetermined average wire diameter.

In a method of the present disclosure, performing an electropolishing step to thereby reduce an average diameter of the plurality of wires to the predetermined average wire diameter may for example comprise: immersing the structure obtained after removal of the template in an etching solution forming a passive, insulating layer on the surfaces of the structure; and subsequently performing an anodization process by applying an anodic current (galvanostatic anodization) or an anodic potential (potentiostatic anodization), resulting in an oxidation process of the material of the structure. This oxidation may be controlled by controlling the duration of the anodization process. The electropolishing step may be followed by rinsing or washing of the porous solid material with water, and removal of residues that may be present after electropolishing.

The etching solution used for electropolishing is selected depending on the solid material forming the structure. For example, in embodiments wherein the solid material is copper, an etching solution comprising $H_3PO_4$ may be used. For example, in embodiments wherein the solid material is nickel, an aqueous alkaline etching solution (for example 0.1 M to 6M KOH) may be used. The subsequent anodization step may, for example, comprise application of cyclic potential sweeps, e.g. between 0.5 V and 1.0 V as measured versus a reversible hydrogen electrode. Each cycle of such sweep results in an oxidation of about 1 nm of the nickel material and the formation of nickel(II)hydroxide $Ni(OH)_2$. Afterward the porous solid material may be cleaned with water and immersed in an aqueous solution of an etchant having a high etch rate towards $Ni(OH)_2$ and a substantially smaller etch rate towards metallic nickel, such as for example an aqueous solution of ammonia. This results in the removal of the electroformed $Ni(OH)_2$ layer.

In a method of the present disclosure, performing a chemical etching step to thereby reduce an average diameter of the plurality of wires to the predetermined average wire diameter comprises etching in an etching composition that is selected depending on the solid material forming the structure. Suitable etching compositions for a wide range of materials are known in the art.

For a given average interwire distance $D_{NW}$, both approaches for adjusting the average wire diameter $d_{NW}$ (increasing the average wire diameter by etching the plurality of channels at one hand; reducing the average wire diameter by etching at the other hand) result in adjusting and controlling the average wire spacing, which corresponds to the average pore size $d_{pore}$. Combined with controlling the interwire distance $D_{NW}$, methods of the present disclosure can, therefore, be used to adjust and control the volumetric surface area, the porosity and the average pore size of the solid porous material.

In the context of the present disclosure, the thickness of the porous solid material is defined as its dimension in a direction substantially orthogonal to a surface of the valve metal layer that has been used for forming the template, in which the porous solid material is formed. In the context of this description, this direction corresponds to the first longitudinal direction of the plurality of first wires 101. In a method of the present disclosure, the thickness of the porous solid material can be controlled, for example by controlling the duration of the step of depositing the solid material within the plurality of interconnected channels of the template. For example, in embodiments wherein depositing the solid material comprises nickel plating, the thickness of the porous solid material is linearly proportional to the plating time. It is an advantage of a method of the present disclosure that anodization based templates may be formed in a broad range of thicknesses, for example with a thickness ranging between 100 nm and 150 micrometers. Therefore, a porous solid material of the present disclosure may be fabricated within the same broad range of thicknesses and it may have a thickness ranging between 100 nm and 150 micrometers.

Figure 7:
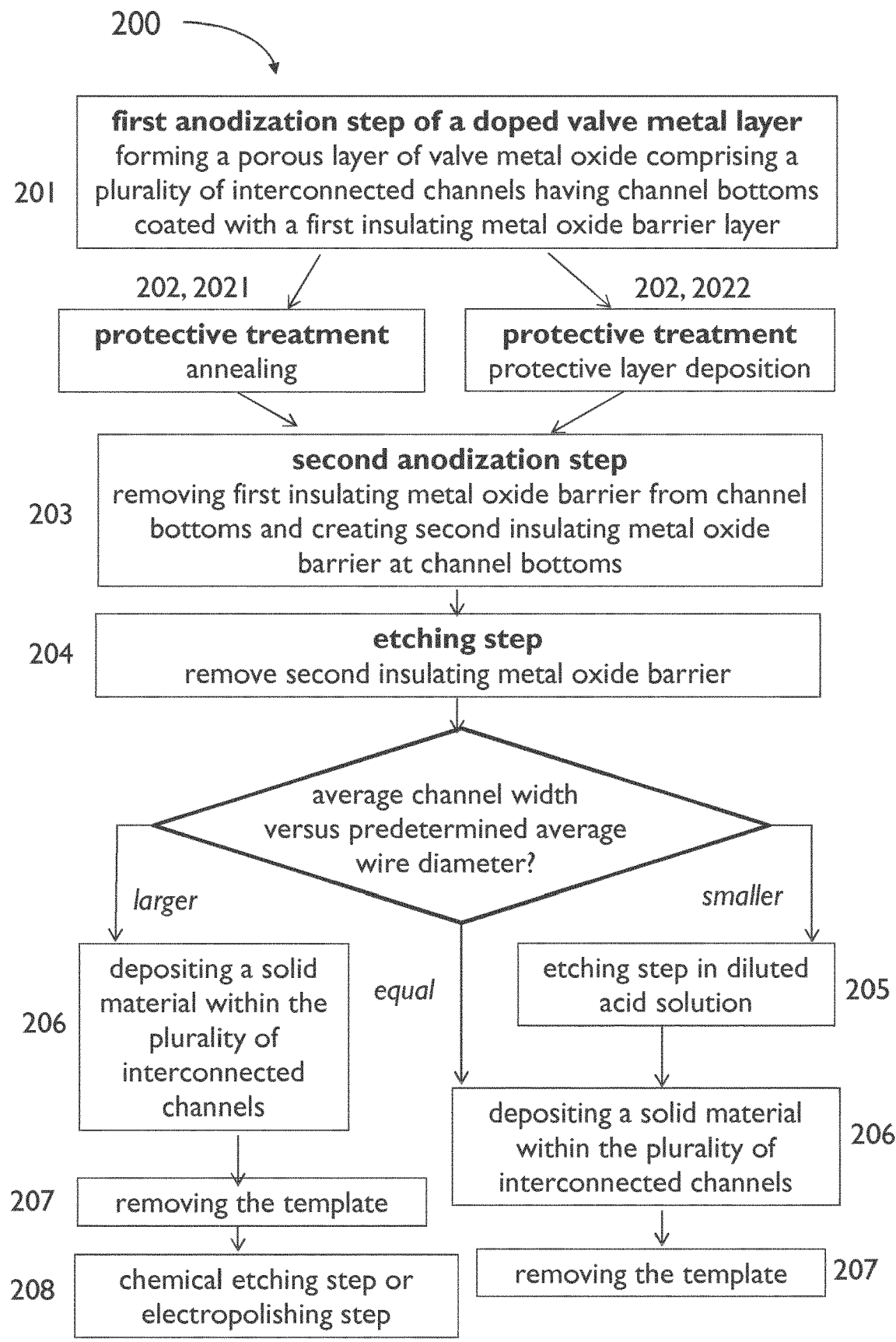
FIG. 7 illustrates an exemplary process sequence of a method for forming a porous solid material, according to an embodiment of the second aspect of the present disclosure.

FIG. 7 illustrates an exemplary process sequence of a method for forming a porous solid material, according to an embodiment of the second aspect of the present disclosure.

As illustrated in the example shown in FIG. 7, a method 200 according to an embodiment of the second aspect of the present disclosure comprises performing a first anodization step 201 of a doped valve metal layer at a predetermined anodization voltage, the first anodization step 201 resulting in the formation of a porous layer of valve metal oxide comprising a plurality of interconnected channels. The plurality of interconnected channels forms an ordered network comprising a plurality of first channels having a first longitudinal direction and a plurality of second channels having a second longitudinal direction different from, e.g. substantially orthogonal to, the first longitudinal direction. The anodization voltage of the first anodization step is selected to form the plurality of interconnected channels with a distance between neighboring channels that is substantially equal to a predetermined average interwire distance of the porous solid material to be formed. As a result of the first anodization step 201, each of the plurality of interconnected channels has channel walls and the plurality of first channels have a channel bottom. As a result of the first anodization step, the surfaces of the channel bottoms are covered with a first insulating metal oxide barrier layer, for example a first valve metal oxide barrier layer.

In embodiments of the present disclosure, the doped valve metal layer may be a free-standing layer, for example a flexible free-standing layer such as a metal foil. In embodiments of the present disclosure, the doped valve metal layer may be provided on a substrate, for example on a rigid substrate or on a flexible substrate.

In embodiments of the present disclosure the first longitudinal direction may correspond to a thickness direction of the doped valve metal layer, i.e. it may be substantially orthogonal to a surface of the doped valve metal layer. In embodiments of the present disclosure the second longitudinal direction may be substantially orthogonal to the thickness direction of the doped valve metal layer, i.e. it may be substantially parallel with a surface of the doped valve metal layer. However, the present disclosure is not limited thereto. For example, the first longitudinal direction may be at an angle, for example at an angle ranging between 60° and 90°, with respect to a surface of the doped valve metal layer. The second longitudinal direction is typically substantially orthogonal to the first longitudinal direction.

In embodiments of the second aspect of the present disclosure, the doped valve metal layer may be anodized only partially, i.e. only part of the doped valve metal layer may be anodized in its thickness direction. This results in a stack comprising a non-anodized part of the doped valve metal layer and an anodized part (comprising a plurality of interconnected channels) of the doped valve metal layer. However, the present disclosure is not limited thereto. For example, in embodiments wherein the doped valve metal layer is provided on a substrate the porous layer comprising the plurality of interconnected channels may also be formed throughout the doped valve metal layer, thereby exposing the underlying substrate at the channel bottoms.

A method 200 according to embodiments of the second aspect of the present disclosure comprises, after the first anodization step 201, performing a protective treatment 202 (FIG. 7). The protective treatment induces hydrophobic surfaces to the channel walls and to the channel bottoms, i.e. it results in channels having hydrophobic channel wall surfaces and hydrophobic channel bottom surfaces.

In embodiments of the second aspect of the present disclosure, performing the protective treatment may comprise annealing 202, 2021 (FIG. 7), such as for example annealing at a temperature ranging between 300° C. and 550° C. The annealing may be done in an inert atmosphere, such as for example in nitrogen or argon, or in air. Annealing may be done under ambient pressure or at a reduced pressure, such as in vacuum.

In embodiments of the second aspect of the present disclosure, performing the protective treatment may comprise depositing 202, 2022 (FIG. 7) a protective layer over the channel walls and over the channel bottoms. The protective layer is thereby also formed on an upper surface of the porous layer.

In embodiments, the protective layer may be a layer comprising hydrophobic silane, e.g. formed by vapor deposition, for example in air or in vacuum, for example at a temperature ranging between 80° C. and 120° C. In other embodiments, the protective layer may be a polymer layer, e.g. formed by application of polymer solution onto the channel walls and bottoms and drying. Such a protective polymer layer may for example be formed by immersing the sample in 1% to 20% solution of polystyrene or PMMA (poly(methyl 2-methylpropanoate)) or PDMS (poly(dimethylsiloxane)), dissolved in acetone, in toluene or in a chlorinated solvent such as dichloromethane and spin coating the excess of the solution, followed by drying at a temperature e.g. ranging between 20° C. and 60° C., e.g. in air or in vacuum.

In embodiments of the second aspect of the present disclosure, performing the protective treatment may comprise both depositing 202, 2022 (FIG. 7) a protective layer over, e.g. directly on, the channel walls and over the channel bottoms and annealing 202, 2021 (FIG. 7).

The protective treatment results in the formation of hydrophobic surfaces on the channel walls and channel bottoms. Such a hydrophobic surface may advantageously provide protection against wetting, e.g. against wetting by an etchant used in subsequent process steps, and therefore it may provide protection against etching.

A method 200 according to embodiments of the second aspect of the present disclosure comprises, after the protective treatment 202, 2021, 2022, a second anodization step 203 (FIG. 7). The second anodization step 203 may, for example, be done using similar anodization conditions as used for the first anodization step, preferably for a relatively short period, such as for example one minute to 30 minutes. In embodiments of the present disclosure, this second anodization step 203 affects the channel bottoms only and induces hydrophilic surfaces at the channel bottoms only. In embodiments wherein a protective layer has been deposited (FIG. 7, step 2022), the second anodization step 203 results in the removal of the protective layer from the bottom of the plurality of first channels. The second anodization step thus results in the formation of hydrophilic, unprotected channel bottoms (e.g. not protected against wetting). The second anodization step further results in the removal of the first insulating metal oxide barrier layer from the channel bottoms. The second anodization step leaves the plurality of channel walls substantially unaffected, i.e. the plurality of channel walls remains substantially protected. The second anodization step results in further anodization only at the bottoms of the plurality of first channels and creates a second (unprotected) insulating metal oxide barrier layer at the channel bottoms.

A method 200 according to embodiments of the second aspect of the present disclosure further comprises an etching step 204 (FIG. 7), for example in an acidic etching solution or in a basic etching solution. At this stage of the process, the channel walls are substantially protected against etching, e.g. against wetting, as a result of the protective treatment 202 previously performed, resulting in hydrophobic surfaces at the channel walls. At this stage of the process, only the channel bottoms (more in particular the second insulating metal oxide barrier layer at the channel bottoms) are subject to wetting and thus etching. Therefore, this etching step 204 only removes the second insulating metal oxide barrier layer from the plurality of channel bottoms and does not affect the porous layer of valve metal oxide. This has as an advantage that widening of the plurality of channels during this etching step is substantially avoided. The etching step may, for example, comprise etching in an aqueous solution of $H_3PO_4$ or KOH. The etching solution may advantageously comprise a surface tension adjusting agent such as for example ethanol, isopropyl alcohol, acetone or sodium dodecyl sulfate, the present disclosure not being limited thereto. For example, a solution comprising 1 wt % to 30 wt % of $H_3PO_4$ and 1 wt % to 60 wt % of isopropyl alcohol in water may be used for the etching step.

After the etching step 204, the structure may be immersed in a basic solution of zinc oxide to thereby produce a thin conductive zinc layer at the channel bottoms. The presence of such a thin conductive zinc layer at the channel bottoms enables or facilitates electroplating of a variety of metals in the plurality of channels in a subsequent step.

In embodiments of the present disclosure, the valve metal layer may, for example, consist of a doped aluminum layer, such as for example a copper-doped aluminum layer, e.g. with a doping concentration ranging between 1% and 10% and a thickness e.g. ranging between 1 micrometer and 1 mm. However, the present disclosure is not limited thereto. For example, the aluminum layer may be doped with other elements than copper, such as for example with silicon, germanium, gold, iron or molybdenum. For example, the doped valve metal layer may comprise a layer of aluminum, an aluminum alloy, titanium, a titanium alloy, tantalum or a tantalum alloy.

The first anodization step of the valve metal layer, for example a layer comprising aluminum, may be performed by immersing the valve metal layer in an anodizing solution, for example an acidic medium, such as a solution of sulfuric, oxalic or phosphoric acid and applying a constant voltage difference (anodization voltage) between the valve metal layer and a counter electrode such as a titanium electrode (e.g. a sheet or a mesh) or a platinum electrode (potentiostatic anodization). The voltage difference may, for example, range between 10 V and 500 V. By selecting and controlling the anodization parameters the width of the plurality of channels and the distance between neighboring channels may be well controlled.

In embodiments, the second anodization step 203 may be performed under irradiation of ultrasonic waves. Such ultrasonic waves may, for example, be generated by an ultrasound generating horn, immersed in the anodizing solution. It is an advantage of providing ultrasonic waves that it may facilitate removal of the first insulating metal oxide barrier layer and, if present, removal of the protective layer from the channel bottoms during the second anodization step 203. It is an advantage of providing ultrasonic waves that it may further facilitate removal of the second insulating metal oxide barrier layer from the channel bottoms during the etching step 204.

The method 200 further comprises depositing 206 a solid material within the plurality of interconnected channels of the template. This results in the formation of a plurality of interconnected wires inside the plurality of interconnected channels, the plurality of interconnected wires forming an ordered network comprising a plurality of first wires having the first longitudinal direction and a plurality of second wires having the second longitudinal direction. The plurality of first wires and the plurality of second wires are arranged according to a regular pattern, with an average interwire distance equal to the average distance between neighboring template channels and having an average wire diameter equal to an average width of the channels.

In embodiments of a method of the present disclosure, the solid material may be deposited within the plurality of channels to thereby completely fill the plurality of channels in their width direction (lateral direction), which may result for example in the formation of a plurality of full wires or pillars within the plurality of channels. In other embodiments, the solid material may be deposited within the plurality of channels to thereby only partially fill the plurality of channels in their width direction, which may for example result in the formation of a plurality of tubes or hollow wires inside the plurality of channels.

After having deposited the solid material, the template may be removed by etching 207 (FIG. 7). For this etching step 207, for example a solution comprising 0.1M to 1M KOH may be used. The etching time may, for example, range between 20 minutes and 90 minutes, and etching may be done at a temperature e.g. ranging between 20° C. and 60° C.

In embodiments of the present disclosure wherein the average channel width of the template is larger than a predetermined average wire diameter of the plurality of interconnected wires of the porous solid material to be fabricated, the resulting material comprises a plurality of interconnected wires having an average wire diameter that is larger than the predetermined average wire diameter. In such embodiments, after the template removal step 207, the material is subjected to a chemical etching step or an electropolishing step 208 (FIG. 7), to thereby reduce an average diameter of the plurality of wires to the predetermined average wire diameter.

In embodiments of the present disclosure wherein the average channel width of the template is smaller than a predetermined wire diameter of the plurality of interconnected wires of the porous solid material to be fabricated, an etching step 205 (FIG. 7) in a diluted acid solution is performed before the step of depositing 206 the solid material within the plurality of interconnected channels (FIG. 7), to thereby increase the average channel width of the plurality of interconnected channels to an increased average channel width that is substantially equal to the predetermined wire diameter.

In embodiments of the second aspect of the present disclosure, depositing the solid material within the plurality of interconnected channels may comprise depositing an electrically conductive material, a semiconductor material, an electrically insulating material or a combination thereof. Depositing the solid material may, for example, comprise Chemical Vapor Deposition, e.g. Atomic Layer Deposition, the present disclosure not being limited thereto. Depositing an electrically conductive material may, for example, comprise depositing the material by galvanostatic or potentiostatic electrodeposition or plating, the present disclosure not being limited thereto.

For example, in a method 200 according to embodiments of the present disclosure, nickel may be deposited by galvanostatic electrodeposition from a solution of nickel sulphamate and boric acid and/or nickel chloride at a temperature ranging between 20° C. and 60° C. The growth may be performed by application of a cathodic current (e.g. 1-20 mA/cm$^2$) between an electrically conductive support of the template (e.g. a non-anodized part of the valve metal layer used for forming the template or another electrically conductive support of the template) and a metallic counter electrode, such as a nickel or platinum counter electrode. The thickness of the porous solid material length can be controlled by controlling the time of deposition.

Examples are provided hereinbelow, which illustrate experiments in which a method according to embodiments of the second aspect of the present disclosure was used for fabricating porous solid materials according to embodiments of the first aspect of the present disclosure. These examples are provided for illustrating features and advantages of embodiments of the present disclosure, and to aid the skilled person in reducing the disclosure to practice. However, these examples should not be construed as limiting the disclosure in any way.

Experiments were performed wherein a porous solid material was fabricated according to an embodiment of a method of the present disclosure, using a doped aluminum layer for fabricating the template and performing the anodization steps at 40 V, and using electroplating of nickel for depositing the solid material within the plurality of interconnected channels of the template.

In the experiments described below, templates were prepared by anodizing 2.4 cm×2.4 cm coupons of a wafer stack comprising a 4-micrometer thick aluminum layer doped with 0.22% at. Cu, the doped aluminum layer being provided by PVD sputtering on a 150 nm thick PVD-sputtered TiN layer on a silicon wafer. The anodization was performed in a two-electrode setup, wherein the sample (coupon) acted as a working electrode and a titanium mesh was used as a counter electrode. The templates were formed in 0.3M oxalic acid, at 40V anodization potential. The sample was maintained at 30° C. and stirring of the electrolyte was provided by a mechanical stirrer operating at 1900 rpm and placed above the counter electrode. The anodization was carried out until the total charge passed reached the value of 11.4 C/cm$^2$, after which a fast decline in current was observed, indicating complete oxidation of the aluminum layer. In order to uniformly breach the barrier layer formed between the AAO and TiN, upon reaching 11.4 C/cm$^2$ charge, the rest of the anodization step (denoted as overanodization) was carried out under ultrasonic irradiation provided by a 7-mm titanium sonotrode situated 20 mm above the sample surface. The ultrasounds were generated with a Hielscher UPS200S 200 W 24 kHz ultrasonic generator, operating at 30% amplitude and 0.3 pulse cycle. The overanodization was carried out for 500 s after the point of current decline. A TiO$_2$ layer formed during overanodization was removed. The sample was immersed in a solution of 1:1:5 volumetric ratio of 30% H$_2$O$_2$:29% NH$_3$(aq)):H$_2$O at 30° C. for 4.5 min, followed by rinsing with H$_2$O.

In the experiments described below, porous solid nickel materials were formed by electroplating nickel in the templates from a 0.62M Ni(SO$_3$NH$_2$)$_2$+0.62M H$_3$BO$_3$ bath at −10 mA/cm$^2$ and 30° C., using nickel foil (99.9% purity) as a counter electrode. To remove (dissolve) the template after plating, the samples were immersed in 0.5M KOH for 30 minutes at 30° C., followed by rinsing with H$_2$O.

After template removal, a porous solid material comprising a plurality of interconnected nickel wires was obtained, with an average wire diameter of 40 nm and an average interwire distance of 104 nm. The porosity P of the porous solid material thus fabricated was determined by comparing the thickness of the solid porous material, measured with SEM, to the expected thickness for a dense nickel layer formed at the same electroplating conditions. It was found that the thickness of the solid porous material increases proportionally with the electroplating time. Thicknesses ranging from 0.65 micrometer for 50 seconds of plating to 3.3 micrometer for 250 seconds of plating were measured, corresponding to a growth rate of 14 nm/s. Faraday's law predicts a growth rate of 3.3 nm/s for a dense nickel layer plated at the same current density, taking into account a plating current efficiency of 95.5%. Based on a comparison between the growth rate of the porous solid material (14 nm/s) and the growth rate of bulk nickel (3.3 nm/s) a porosity of 76±0.5% is calculated for the porous solid material. This value is in good agreement with a porosity of 72% as derived from the geometrical model based on the average nanowire diameter $d_{NW}$ and the average nanowire distance $D_{NW}$ described above (equation (1)). The high porosity of the porous solid material can be attributed to the high ratio (2.6) between the average interwire distance $D_{NW}$ (104 nm) and the average nanowire diameter ($d_{NW}$).

Furthermore, for this porous solid material it was observed that the pore size as determined in two different directions (more in particular in a direction corresponding to a hexagonal pore cross-section, as illustrated in FIG. 1(a), and in a direction corresponding to a rectangular pore cross-section, as illustrated in FIG. 1(b)) was substantially the same for both directions, with an average pore size of 64±1 nm. For higher anodization voltages (i.e. for anodization voltages higher than 40 V), the pore size is expected to be somewhat larger in a direction corresponding to the hexagonal pore cross section than in a direction corresponding to the rectangular cross-section. Pore sizes were calculated by means of equation (3) above, using measured values for the average wire diameter $d_{NW}$ and for the average interwire distance $D_{NW}$.

A statistical analysis of the pore size distribution indicates that mesopores with a pore diameter ranging between 15 nm and 50 nm constitute about 22% of the total porosity while the remaining 78% of the porosity is related to macropores with a pore diameter ranging between 50 nm and 120 nm. Furthermore, it was observed that 75% of all the pores of the material have a pore size ranging between 45 nm and 80 nm, illustrating a pore size distribution that is substantially narrower than pore size distributions as for example reported for metal aerogels, having simultaneously pore sizes ranging from a few nanometers up to millimeters. Such improvement of the pore size distribution, i.e. improvement of the pore size uniformity, can be attributed to a well-controlled ordered arrangement of the plurality of interconnected channels of the template as used in a method of the present disclosure, resulting in a well-controlled ordered arrangement of the plurality of interconnected wires of the porous solid material.

As known by a person skilled in the art, the pore size distribution of a porous material may be assessed by means of gas adsorption techniques, mercury intrusion porosimetry, ultra-small angle neutron scattering (USANS) or SEM analysis.

Cyclic voltammetry (CV) and electrochemical impedance spectroscopy (EIS) were used to determine the volumetric surface area of the porous solid materials when used as an electrode in an alkaline potassium hydroxide solution. These electrochemical methods were used instead of more standard gas adsorption techniques since estimation of the surface area using the latter is restricted by a detection limit of about 0.1 m$^2$, which is a few orders of magnitude higher than the volumetric surface area of porous solid materials of the present disclosure having a thickness of a few micrometers as fabricated in the experiments.

The measurements were performed with the porous solid material sample being connected as a working electrode, using two platinum meshes as a counter electrode and Hg/HgO/2M KOH (0.104V vs normal hydrogen electrode—NHE) as a reference electrode, measuring the potential near the sample surface through a Luggin capillary. The potentials are referenced to RHE (—0.938V vs Hg/HgO). Prior to each CV and EIS experiment, samples were polarized at +0.55V vs RHE for 60 s, followed by a linear decrease of the potential down to −0.30V at 10 mV/s, and finally held at 0.30V for 20 s to reduce the native oxide layer. Each experiment was performed in a freshly replaced electrolyte and repeated at least 3 times. Cyclic voltammetry measurements were done at 21° C., with a scan speed of 50 mV/s, in the potential range of −0.30V and +0.55V, recording 3 scans each time. The electrochemical impedance spectroscopy was performed at −0.17V vs RHE by applying an AC signal with a 10 mV amplitude in the 5 kHz-0.5 Hz frequency range. Prior to each measurement, the samples were stabilized at the measurement potential for 60 s. As a reference, experiments were performed under similar conditions on a planar nickel foil, freshly polished to mirror quality.

A cross-validation of the surface area measurements was done by Kr adsorption at 77K and applying the BET (Brunauer-Emmett-Teller) method in the 0.003-0.005 p/p$^0$ range. Prior to the measurement, the samples were degassed in vacuum at 110° C. for 12 h. Five samples (each having a 3.3 µm-thick porous solid material) were measured simultaneously to be above the detection limit (0.1 m$^2$). After the measurement, the results were corrected for the sample area not covered with the solid porous material (approximately 11 cm$^2$ each) and normalized per sample.

In the cyclic voltammetry measurement, the surface of a porous solid electrode material was reversibly electro-passivated with a monolayer of nickel hydroxide, and simultaneously the electric charge and peak current associated with this surface-limited reaction were measured. In the EIS measurement, the porous solid material electrode was polarized at the potential of water reduction and the double layer capacitance of the electrode was measured. The surface area of the porous solid material was then determined by comparing the signals (passivation charge, passivation peak current and double layer capacitance) measured on the porous solid material electrodes with the respective signals determined on a mirror-polished nickel foil, measured under the same conditions. To ensure the accuracy of the planar reference, the relative (or effective) surface area (i.e. the surface area normalized to the geometrical footprint area) of the planar foil was verified by Atomic Force Microscopy, giving a relative surface area of 1.005.

Figure 8:
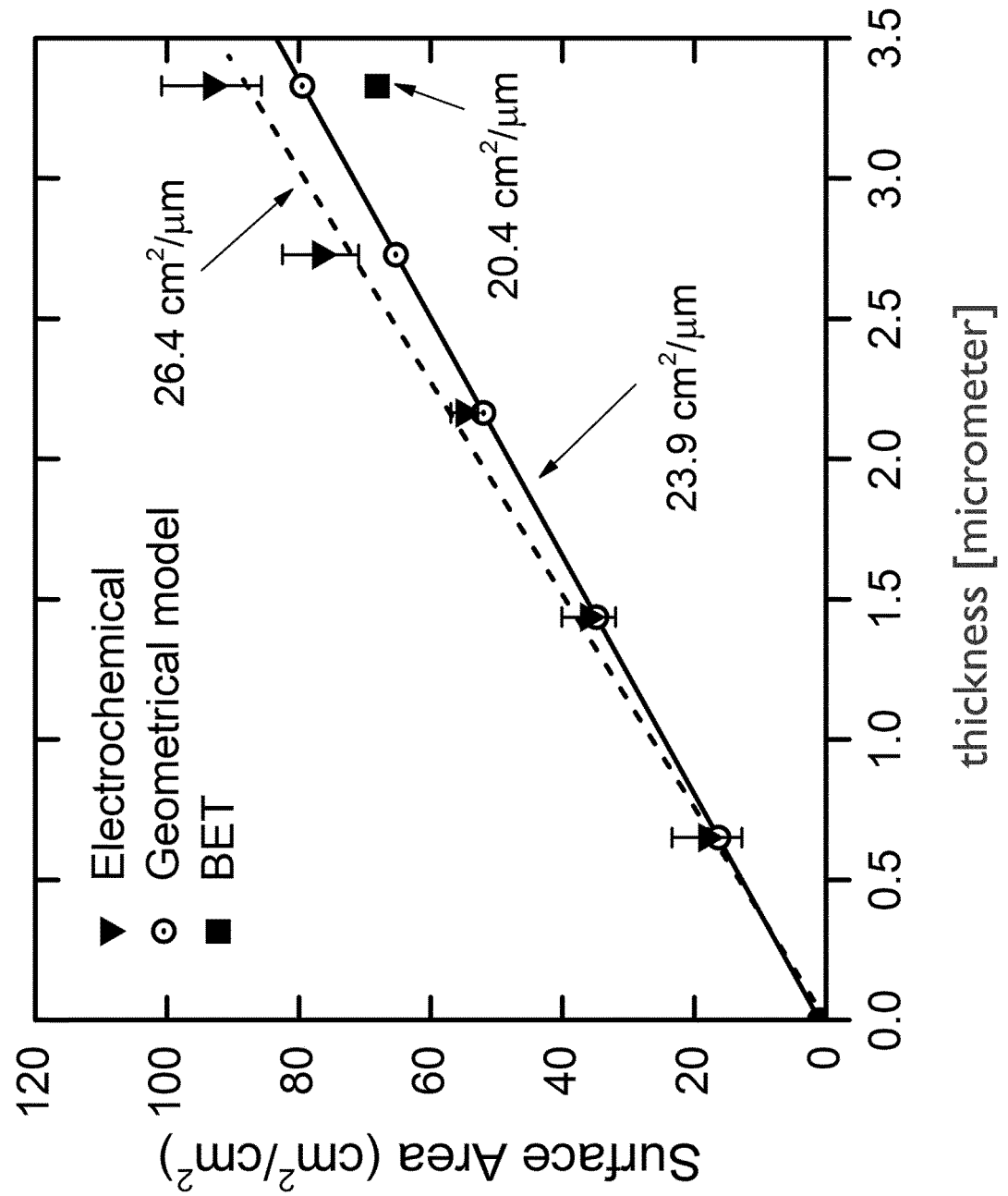
FIG. 8 shows the experimentally determined volumetric surface area of a porous solid material having an average wire diameter of 40 nm and an average interwire distance of 104 nm in accordance with an embodiment of the present disclosure as a function of the porous solid material thickness.

Results of these measurements are summarized in FIG. 8 for a solid porous material of the present disclosure comprising a plurality of interconnected wires with an average wire diameter of 40 nm and an average interwire distance of 104 nm, the solid porous material having a footprint area of 1 cm$^2$. In FIG. 8, the inverted triangles are based on the two electrochemical measurement methods described above; circles are based on geometrical SEM analysis; and the filled square is based on the BET Kr adsorption technique. It is observed that the surface area of the porous solid material normalized to its footprint area linearly increases with the total thickness of the material, ranging from about 20 cm$^2$ for a 0.65 micrometer thick material up to 90 cm$^2$ for a 3.3 micrometer thick material. Thus, the volumetric surface area of the material can be estimated as 26±2 m$^2$/cm$^3$. This value is in good agreement with a volumetric surface area of 24 m$^2$/cm$^3$ as derived from the geometrical model based on the average nanowire diameter d$_{NW}$ and the average nanowire distance D$_{NW}$ described above (equation (2)). It is also in satisfactory agreement with the volumetric surface area of 20 m$^2$/cm$^3$ as determined by BET, given the limitations of the BET technique for the analysis of the surface area of few-micrometer thick materials a described above.

Figure 9:
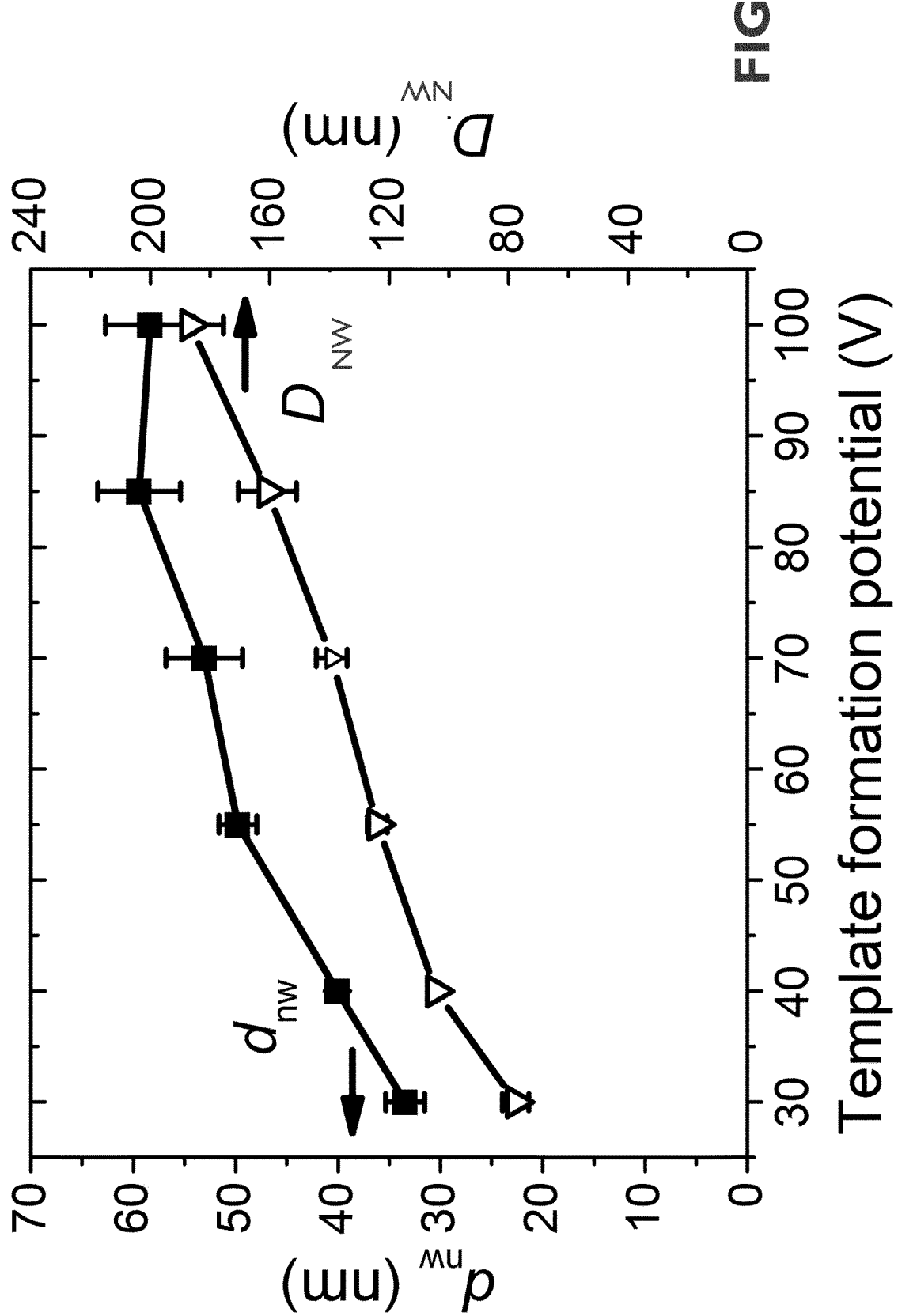
FIG. 9 shows measurement results, illustrating the average interwire distance (inverted triangles), and the average wire diameter (filled squares) as a function of the anodization potential used for forming a template in a method of the present disclosure.
Figure 10:
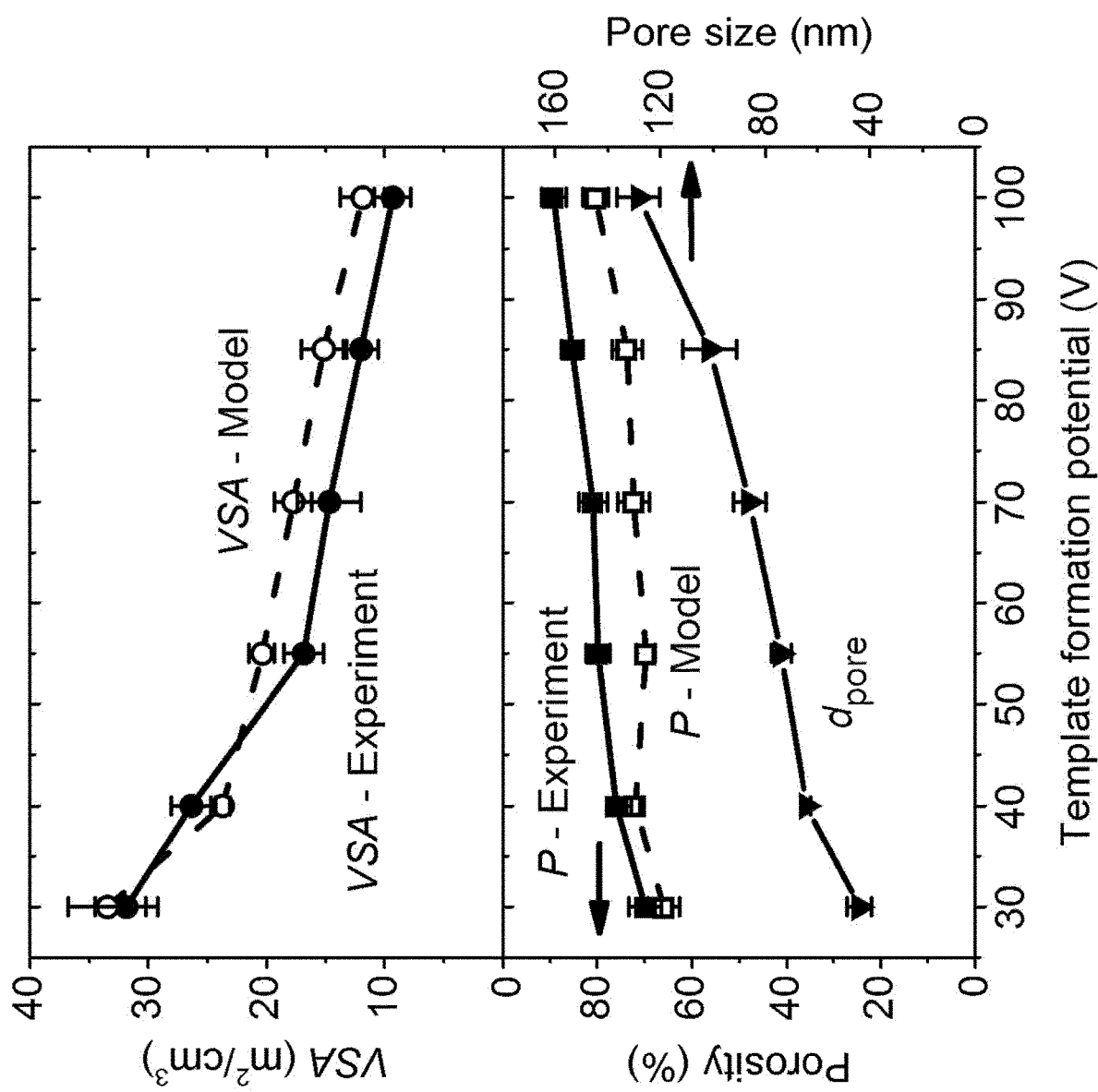
FIG. 10 illustrates the volumetric surface area (circles), the porosity (squares) and the average pore size (inverted triangles) as a function of the anodization potential used for forming a template in a method of the present disclosure. Open symbols represent simulation results; filled symbols represent measured results.

Further experiments were performed with different anodization voltages for forming the template, resulting in a different average distance between neighboring channels of the template and thus a different average interwire distance of the solid porous material formed therein. This resulted to a lesser extent in a different average channel width of the template and thus a different average wire diameter of the porous solid material formed therein. This is illustrated in FIG. 9, showing the average interwire distance D$_{NW}$ (inverted triangles) and the average wire diameter d$_{NW}$ (filled squares) as measured by SEM, as a function of the anodization potential used for forming the template. FIG. 10 illustrates the volumetric surface area VSA (circles), the porosity P (squares) and the average pore size d$_{pore}$ (inverted triangles) as a function of the anodization potential used for forming a template in a method of the present disclosure. Open symbols represent simulation results; filled symbols represent measured results.

The results illustrated in FIG. 9 and FIG. 10 illustrate that the porosity of the porous solid material varies linearly with the anodization voltage. For example, lowering the anodization potential from 40V to 30V resulted in a porous solid material with a reduced average interwire distance, from 104 nm at 40V anodization potential to 77 nm at 30V anodization potential, and in a reduced average wire diameter, from 40 nm at 40 V anodization potential to 34 nm at 30V anodization potential. The volumetric surface area increased to 32 m$^2$/cm$^3$, while the porosity decreased slightly to 70%. On the other hand, an increase of the anodization potential from 40V up to 100V resulted in an increase of the average interwire separation distance, from 104 nm at 40V anodization potential to 188 nm at 100 V anodization potential, as well as in an increased average wire diameter, from 40 nm at 40V anodization potential to 58 nm at 100V anodization potential. The anodization at 100V enables the fabrication of porous solid materials with an average pore size in the order of 128 nm, which is twice the average pore size of porous solid materials formed from alumina anodized at 40V. Anodization at 100V resulted in a porous solid material with a high porosity of up to 89%, with a volumetric surface area in the order of 9 m$^2$/cm$^3$. The volumetric surface area and the porosity of a porous solid material of the present disclosure show a polynomial dependence on the anodization potential used for forming the template, which is in good agreement with the polynomial trend predicted by the geometrical model described above based on the average nanowire diameter d$_{NW}$ and the average nanowire distance D$_{NW}$. For each sample, the average nanowire diameter d$_{NW}$ and the average nanowire distance D$_{NW}$ were measured with SEM.

The volumetric surface area and the porosity of a porous solid material of the present disclosure thus only depend on the average nanowire diameter d$_{NW}$ and on the average nanowire distance D$_{NW}$. This shows that tuning or adaptation of the volumetric surface area and/or of the porosity of a porous solid material of the present disclosure, for example in view of optimizing its structural properties for a specific application, can be done by only tuning or adapting the average nanowire diameter and/or the average nanowire distance.

Figure 11:
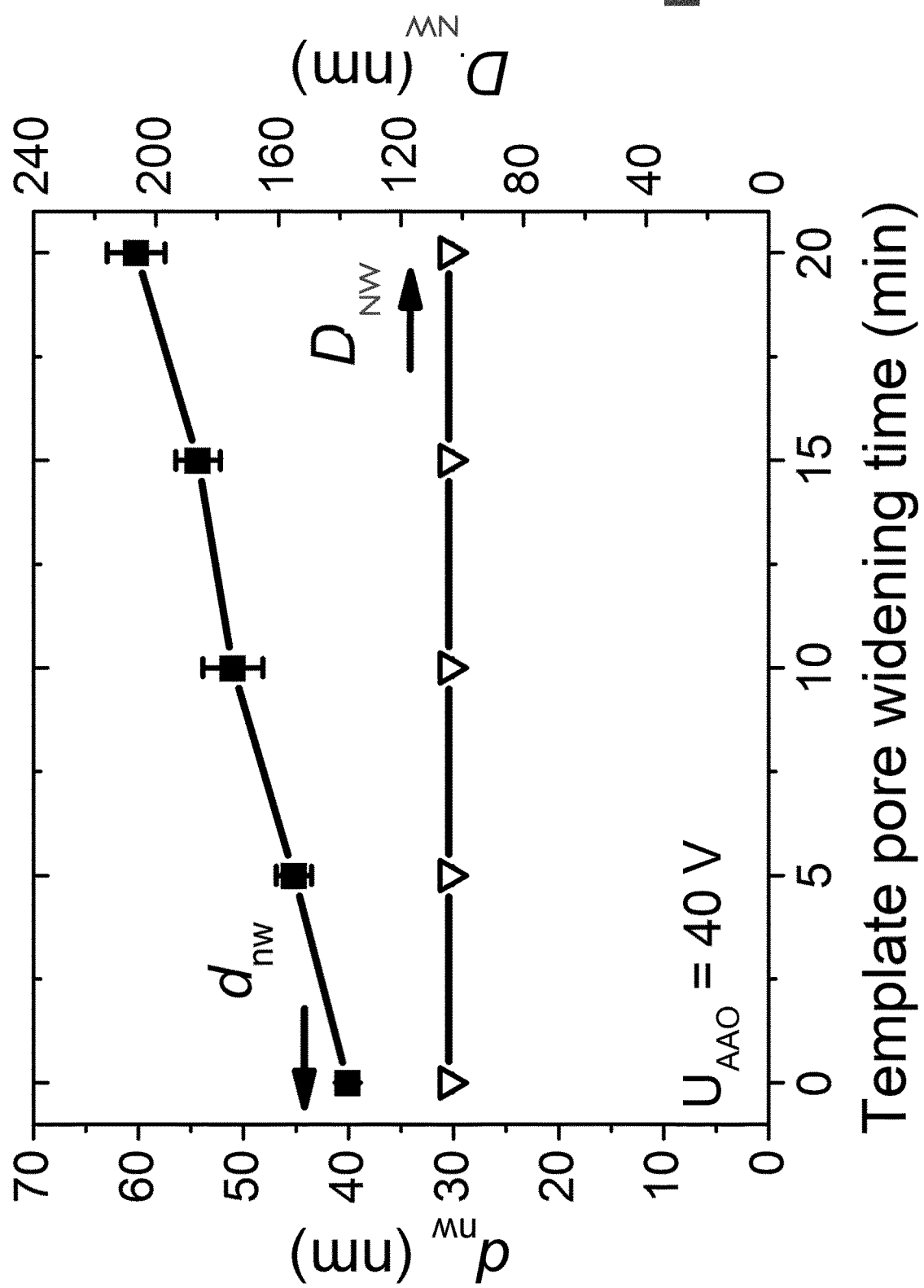
FIG. 11 shows measurement results, illustrating the average interwire distance (inverted triangles) and the average wire diameter (filled squares) for an embodiment of a porous solid material of the present disclosure wherein a template anodized at 40 V anodization potential was used, and wherein before depositing the solid material, the template was etched in a diluted acid solution. Results are shown as a function of the template etching time.
Figure 12:
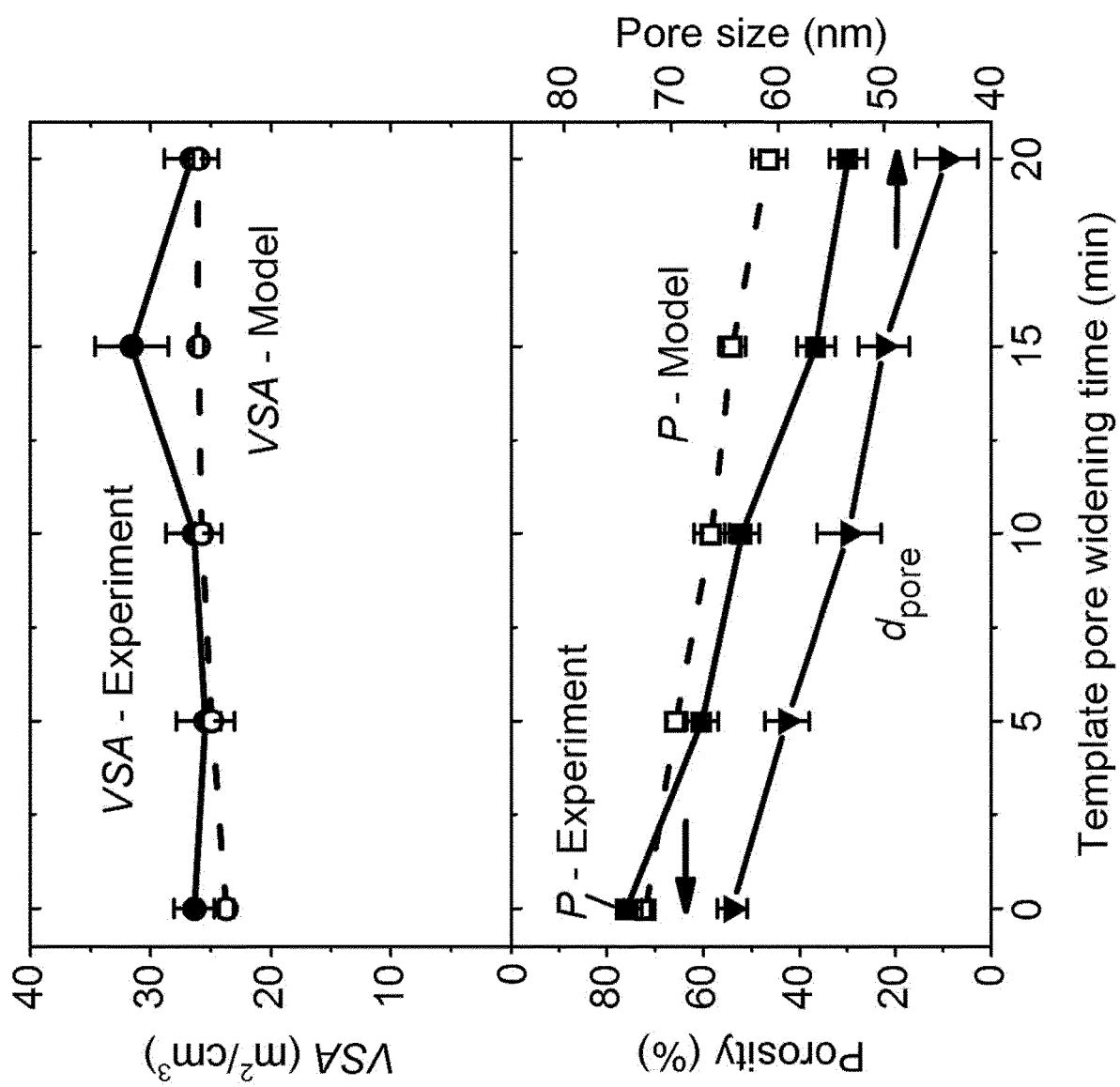
FIG. 12 illustrates the volumetric surface area (circles), the porosity (squares) and the average pore size (inverted triangles) for an embodiment of a porous solid material of the present disclosure fabricated within a template anodized at 40 V anodization potential, wherein before depositing the solid material, the template was etched in a diluted acid solution, Results are shown as a function of the template etching time. Open symbols represent simulation results; filled symbols represent measured results.

Further experiments were performed wherein, before depositing the solid material, the template was etched in a diluted phosphoric acid solution to thereby increase the average channel width without affecting the average distance between neighboring channels of the template, resulting in a larger average wire diameter of the porous solid material formed therein without affecting the average interwire distance. By controlling the etching time, the average wire diameter was gradually increased without changing the average interwire distance. This is illustrated in FIG. 11, showing the average interwire distance D$_{NW}$ (inverted triangles) and the average wire diameter d$_{NW}$ (filled squares) as measured by SEM for a porous solid material of the present disclosure wherein a template anodized at 40 V anodization potential was used, and wherein before depositing the solid material, the template was etched in a diluted acid solution. Results are shown as a function of the template etching time. FIG. 12 illustrates the volumetric surface area VSA (circles), the porosity P (squares) and the average pore size d$_{pore}$ (inverted triangles) for this embodiment as a function of the template etching time. Open symbols represent simulation results; filled symbols represent measured results.

The results show that, as a result of performing the template etching step, the average pore size of the porous solid material was linearly reduced from 64 nm (without template etching) to 44 nm after 20 minutes of template etching. It is observed that the volumetric surface area of the porous solid material, in this case, remained substantially unaffected by a change in average wire diameter, and that it amounted to a value ranging between 26 m$^2$/cm$^3$ and 32 m$^2$/cm$^3$ for all shown template etching times. This can be explained by the competing increase of the volumetric surface area due to the increase of the average wire diameter and the reduction of the volumetric surface area due to the increasingly bulky character of the porous solid material. This behavior is accompanied by a significant reduction of its porosity to 29% for the materials produced after 20 minutes of template etching.

Experiments were performed wherein a 4.75 micrometer thick porous solid material according to an embodiment of the present disclosure was used as an electrode for hydrogen generation during alkaline electroreduction of water. A template comprising a plurality of interconnected channels was fabricated by anodization of an aluminum layer, using an anodization voltage of 40 V. After electrodeposition of nickel within the plurality of interconnected channels, the template was removed. This resulted in a porous solid material comprising a plurality of interconnected nickel wires, with 76% porosity and a total surface area of 126 cm$^2$ (normalized to the footprint area). The volumetric surface area was 26 m$^2$/cm$^3$. The high porosity allows minimizing the diffusion resistance inside the electrode while the total surface area may boost the efficiency of the reaction. As benchmarking references, a commercial 1.5 mm thick high-surface nickel foam (96% nominal porosity, 10 cm$^2$ normalized surface area) and a commercial 0.41 mm thick platinized carbon cloth (60 wt % Pt), were used. To further enhance the activity of the nickel foam and the porous solid material of the present disclosure, both materials were coated with platinum nanoparticles, deposited by repetitive chemisorption and electroreduction of hexachloroplatinic acid. Three cycles of platinum deposition onto the porous solid material of the present disclosure resulted in a Pt loading of 0.1 mg/cm$^2$, as confirmed by Rutherford Backscattering (RBS) and Electron Dispersive X-ray spectroscopy (EDX). The measurements were performed against a reversible hydrogen electrode (RHE) in nitrogen-saturated 1M KOH at 21° C. Linear scan voltammetry was performed at 1 mV/s with the correction for uncompensated resistance determined with impedance spectrometry.

Figure 13:
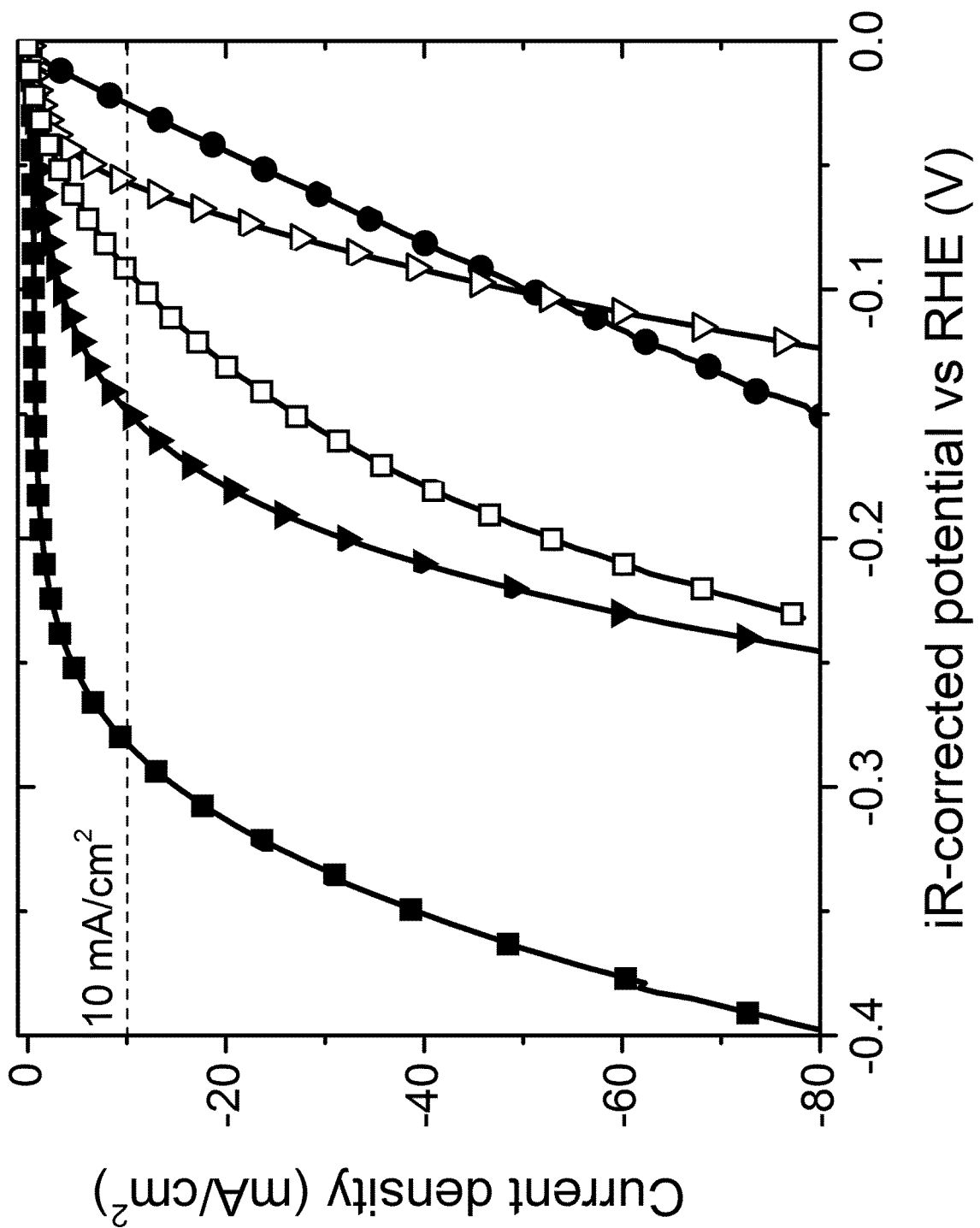
FIG. 13 shows results of linear scan voltammetry measurements recorded in 1M KOH at 21° C. at a scan speed of 1 mV/s, for a commercial 1.5 mm thick nickel foam with 96% nominal porosity and 10 cm² normalized surface area, prior to coating with Pt (filled squares) and after coating with Pt (open squares), for a commercial 0.42 mm thick microporous platinized carbon cloth with 60 wt % content of platinum (0.5 mg/cm²) (filled circles), for a 4.75 micrometer thick porous solid material with 76% porosity and 126 cm² total surface area according to an embodiment of the present disclosure prior to coating with Pt (filled inverted triangles) and after coating with 0.1 mg/cm² Pt content (open inverted triangles).

The linear scan voltammetry measurements are shown in FIG. 13. FIG. 13 shows these results for a commercial 1.5 mm thick nickel foam with 96% nominal porosity and 10 cm$^2$ normalized surface area, prior to coating with Pt (filled squares) and after coating with Pt (open squares), for a commercial 0.42 mm thick microporous platinized carbon cloth with 60 wt % content of platinum (0.5 mg/cm$^2$) (filled circles), for a 4.75 micrometer thick porous solid material with 76% porosity and 126 cm$^2$ total surface area according to an embodiment of the present disclosure prior to coating with Pt (filled inverted triangles) and after coating with Pt (open inverted triangles).

The results show that the porous solid material of the present disclosure delivered significantly higher hydrogen generation currents at any overpotential, as compared to the nickel foam. It was observed that with a porous solid material of the present disclosure, a current of 10 mA/cm$^2$ is reached at 149 mV of overpotential, which is 133 mV less than the nickel foam (282 mV). Upon functionalization of both materials with platinum, their activity towards hydrogen generation significantly increased, reducing the overpotential required to drive 10 mA/cm$^2$ of current down to 91 mV (nickel foam) and only 57 mV (porous solid material). In the low overpotential region, the platinized carbon shows the best performance (10 mA/cm$^2$ at 25 mV).

Figure 14:
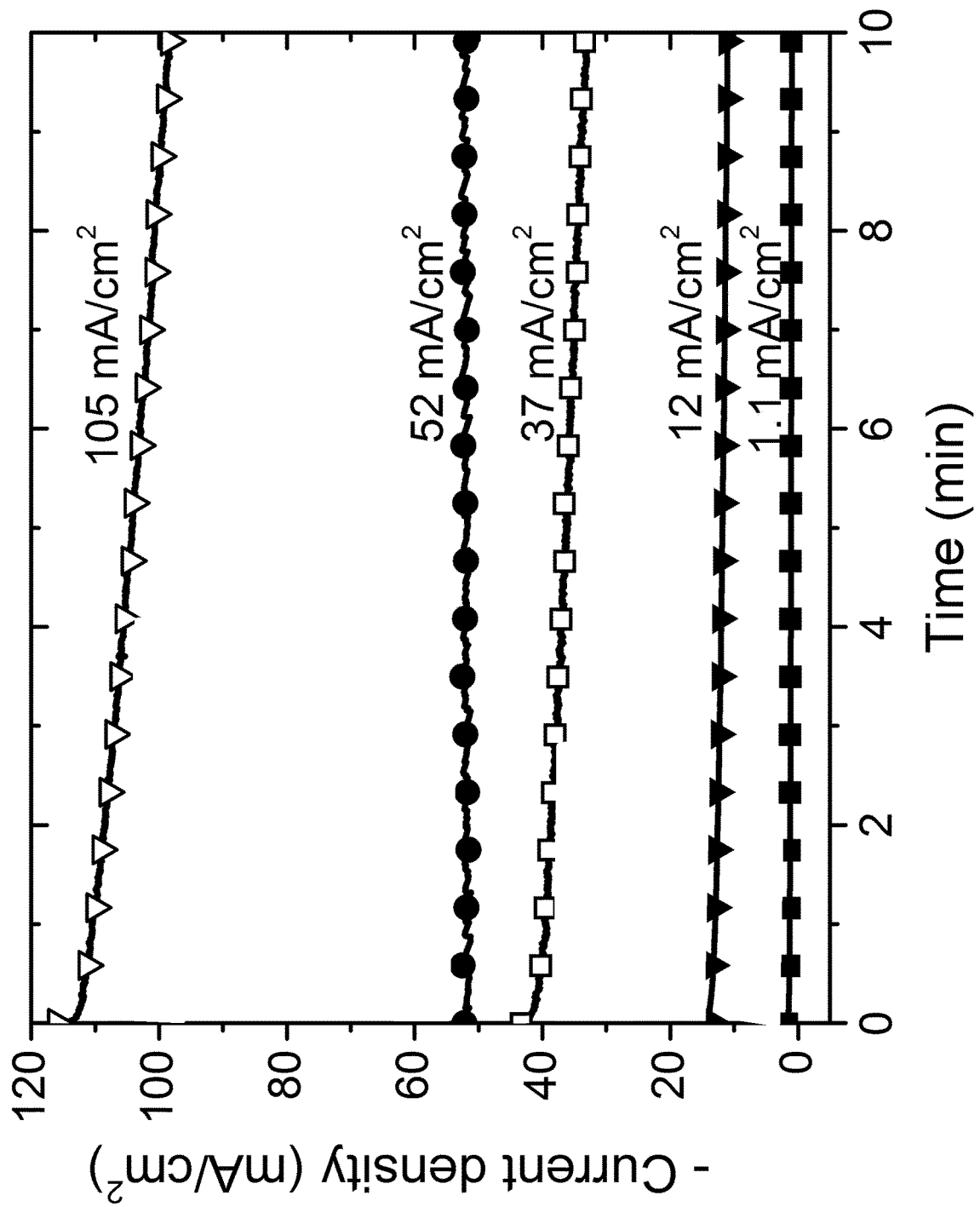
FIG. 14 shows current transients of a commercial 1.5 mm thick nickel foam with 96% nominal porosity and 10 cm² normalized surface area, prior to coating with Pt (filled squares) and after coating with Pt (open squares), for a commercial 0.42 mm thick microporous platinized carbon cloth with 60 wt % content of platinum (0.5 mg/cm²) (filled circles), for a 4.75 micrometer thick porous solid material with 76% porosity and 126 cm² total surface area according to an embodiment of the present disclosure prior to coating with Pt (filled inverted triangles) and after coating with 0.1 mg/cm$^2$ Pt content (open inverted triangles), recorded in 1M KOH at 21° C. at a constant potential of −0.2V versus RHE.

To assess the power performance of the electrodes, the current density was measured at a constant overpotential of −200 mV versus RHE without correction for uncompensated resistance (iR). The results are illustrated in FIG. 14, showing current transients of a commercial 1.5 mm thick nickel foam with 96% nominal porosity and 10 cm$^2$ normalized surface area, prior to coating with Pt (filled squares) and after coating with Pt (open squares), for a commercial 0.42 mm thick microporous platinized carbon cloth with 60 wt % content of platinum (0.5 mg/cm$^2$) (filled circles), for a 4.75 micrometer thick porous solid material with 76% porosity and 126 cm$^2$ total surface area according to an embodiment of the present disclosure prior to coating with Pt (filled inverted triangles) and after coating with Pt (empty inverted triangles).

The few-micron thick porous solid material of the present disclosure delivered the average current of 12 mA/cm$^2$, marking an 11× increase over the current recorded on the millimeter-thick nickel foam (1.1 mA/cm$^2$), which is a clear result of an order of magnitude higher surface area of the porous solid material. After coating with platinum, both the nickel foam and the porous solid metal show significantly higher average currents (37 mA/cm$^2$ and 105 mA/cm$^2$, respectively), yet declining in time due to the hydrogen poisoning of nickel. The modified porous solid material outperformed platinized carbon cloth (52 mA/cm$^2$), which can be ascribed to the lower sheet and diffusion resistance within the macropores of the porous solid material of the present disclosure, as compared to the microporous carbon material.

The foregoing description details certain embodiments of the disclosure. It will be appreciated, however, that no matter how detailed the foregoing appears in the text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

It is to be understood that although preferred embodiments, specific constructions and configurations, as well as materials, have been discussed herein for methods and devices according to the present disclosure various changes or modifications in form and detail may be made without departing from the scope of this disclosure. For example, steps may be added or deleted to methods described within the scope of the present disclosure.

Whereas the above-detailed description, as well as the summary of the disclosure, has been focused on a method for fabricating a device, the present disclosure also relates to a device comprising patterned layers obtained using a method according to any of the embodiments as described above.

The invention claimed is:

1. A method for fabricating a porous solid material comprising a plurality of interconnected electrically conductive wires, the plurality of interconnected electrically conductive wires forming an ordered network comprising a plurality of first wires having a first longitudinal direction and a plurality of second wires having a second longitudinal direction different from the first longitudinal direction, wherein the plurality of first wires and the plurality of second wires are arranged according to a regular pattern with a predetermined average interwire distance between adjacent wires, and wherein the plurality of first wires and the plurality of second wires have a predetermined average wire diameter, wherein the method comprises:
- (a) fabricating a template comprising a plurality of interconnected channels, the fabricating the template comprising:
  - (i) performing a first anodization step of a doped valve metal layer at a predetermined anodization voltage, thereby anodizing at least part of the valve metal layer in a thickness direction and thereby forming a porous layer of valve metal oxide comprising a plurality of interconnected channels, the plurality of interconnected channels forming an ordered network comprising a plurality of first channels having the first longitudinal direction and a plurality of second channels having the second longitudinal direction, wherein the plurality of first channels and the plurality of second channels are arranged according to a regular pattern having the predetermined average interwire distance between adjacent channels, and wherein the plurality of first channels and the plurality of second channels have an average channel width, each channel having channel walls, the plurality of first channels having a channel bottom, the channel bottoms being coated with a first insulating metal oxide barrier layer as a result of the first anodization step;
  - (ii) performing a protective treatment of the porous layer of valve metal oxide, thereby inducing hydrophobic surfaces to the channel walls and channel bottoms;
  - (iii) performing a second anodization step at the predetermined anodization voltage after the protective treatment, thereby substantially removing the first insulating metal oxide barrier layer from the channel bottoms, inducing anodization only at the bottoms of the plurality of first channels and creating a second insulating metal oxide barrier layer at the channel bottoms; and
  - (iv) performing an etching step in an etching solution, thereby removing the second insulating metal oxide barrier layer from the channel bottoms without thereby increasing the average channel width and forming the template;
- (b) afterward depositing a solid electrically conductive material within the plurality of interconnected channels of the template to form the porous solid material comprising the plurality of interconnected electrically conductive wires; and
- (c) afterward removing the template to thereby obtain the porous solid material comprising the plurality of interconnected electrically conductive wires.

2. The method according to claim 1, wherein fabricating the template further comprises, if the average channel width is smaller than the predetermined average wire diameter: before depositing the solid material, performing an etching step in a diluted acid solution to thereby increase the average channel width of the plurality of first channels and the plurality of second channels to an increased average channel width substantially equal to the predetermined average wire diameter.

3. The method according claim 1, further comprising, if the average channel width is larger than the predetermined average wire diameter: after removing the template, performing a chemical etching step or an electropolishing step to thereby reduce an average diameter of the plurality of first wires and the plurality of second wires to the predetermined average wire diameter.

4. The method according to claim 1, wherein the porous solid material has any of:
- a predetermined volumetric surface area ranging between 2 $m^2/cm^3$ and 90 $m^2/cm^3$, a predetermined porosity ranging between 3% and 90% and an electrical conductivity higher than 100 S/cm; or
- a predetermined volumetric surface area ranging between 3 $m^2/cm^3$ and 72 $m^2/cm^3$, a predetermined porosity ranging between 80% and 95% and an electrical conductivity higher than 100 S/cm; or
- a predetermined volumetric surface area ranging between 3 $m^2/cm^3$ and 85 $m^2/cm^3$, a predetermined porosity ranging between 65% and 90% and an electrical conductivity higher than 2000 S/cm.

5. The method according to claim 1, wherein the porous solid material has an electrical conductivity higher than 5000 S/cm.

6. The method according to claim 1, wherein the plurality of interconnected wires comprises a metal, a metal alloy or a semiconductor material.

7. The method according to claim 1, wherein the plurality of interconnected wires comprises Ni, Cu, Au or Pt.

8. The method according to claim 1, wherein the porous solid material comprises a plurality of pores having a pore size ranging between 2 nm and 450 nm, wherein the porous solid material has a pore size distribution with a standard deviation a that is smaller than 30% of an average pore size of the porous solid material.

9. The method according to claim 1, wherein the predetermined average wire diameter ranges between 20 nm and 500 nm and wherein the predetermined average interwire distance ranges between 40 nm and 500 nm.

10. The method according to claim 1, wherein a ratio between the predetermined average interwire distance and the predetermined average wire diameter ranges between 1.1 and 10.

11. The method according to claim 1, wherein a ratio between the predetermined average interwire distance and the predetermined average wire diameter ranges between 1.2 and 3.

12. The method according to claim 1, wherein a ratio between the predetermined average interwire distance and the predetermined average wire diameter ranges between 1.4 and 2.

* * * * *